(12) United States Patent
Obayashi et al.

(10) Patent No.: US 11,330,118 B2
(45) Date of Patent: May 10, 2022

(54) INFORMATION PROCESSING APPARATUS AND NON-TRANSITORY COMPUTER READABLE MEDIUM THAT RECOGNIZE A PRINT COMMAND ON A GROUP CHAT TO OUTPUT DATA FROM IMAGE FORMING APPARATUSES ASSIGNED TO EACH USER

(71) Applicant: FUJIFILM Business Innovation Corp., Tokyo (JP)

(72) Inventors: Nobuyuki Obayashi, Kanagawa (JP); Masaki Kurokawa, Kanagawa (JP); Kenji Nomura, Kanagawa (JP); Mamoru Sasamae, Kanagawa (JP); Yujiro Kobayashi, Kanagawa (JP); Masaaki Takei, Kanagawa (JP); Kenji Yufu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 251 days.

(21) Appl. No.: 16/574,023

(22) Filed: Sep. 17, 2019

(65) Prior Publication Data

US 2020/0099799 A1 Mar. 26, 2020

(30) Foreign Application Priority Data

Sep. 25, 2018 (JP) .............................. JP2018-178263

(51) Int. Cl.
| H04N 1/00 | (2006.01) |
| H04L 51/02 | (2022.01) |
| G06F 3/12 | (2006.01) |
| H04L 51/18 | (2022.01) |
| H04L 51/046 | (2022.01) |

(52) U.S. Cl.
CPC ....... *H04N 1/00392* (2013.01); *G06F 3/1204* (2013.01); *G06F 3/126* (2013.01); *G06F 3/1253* (2013.01); *G06F 3/1255* (2013.01); *G06F 3/1258* (2013.01); *G06F 3/1285* (2013.01); *H04L 51/02* (2013.01); *H04L 51/046* (2013.01);

(Continued)

(58) Field of Classification Search
None
See application file for complete search history.

(56) References Cited

U.S. PATENT DOCUMENTS

| 9,621,492 B2 | 4/2017 | Park et al. | |
| 2013/0077129 A1* | 3/2013 | Soh ....................... G06F 3/1228 |
| | | | 358/1.15 |

(Continued)

FOREIGN PATENT DOCUMENTS

| JP | 2014225268 | 12/2014 |
| JP | 2015144027 | 8/2015 |
| JP | 2015179519 | 10/2015 |

*Primary Examiner* — Haris Sabah
(74) *Attorney, Agent, or Firm* — JCIPRNET

(57) ABSTRACT

An information processing apparatus includes a memory in which information on output devices corresponding to plural users participating in a group chat is stored; and a controller that, in a case where any one of the plural users gives a post indicative of an output command to output data on the group chat, performs control for outputting the data from output devices corresponding to one or more output destination users including a user who has not given the post indicative of the output command among the plural users in accordance with the information stored in the memory.

16 Claims, 17 Drawing Sheets

(52) U.S. Cl.
CPC .......... *H04L 51/18* (2013.01); *H04N 1/00509* (2013.01); *H04N 1/00867* (2013.01)

(56) References Cited

U.S. PATENT DOCUMENTS

| | | |
|---|---|---|
| 2013/0166275 A1 | 6/2013 | Yang et al. |
| 2015/0172505 A1* | 6/2015 | Park .................. H04N 1/00244 358/1.15 |
| 2016/0043975 A1 | 2/2016 | Park et al. |
| 2016/0134568 A1* | 5/2016 | Woo ........................ H04L 51/02 709/206 |
| 2018/0104816 A1* | 4/2018 | Tokuchi ................ B25J 9/1697 |
| 2018/0267963 A1* | 9/2018 | Ogata ................ G05B 19/0423 |
| 2019/0369924 A1* | 12/2019 | Oka ...................... H04L 51/046 |

* cited by examiner

FIG. 4

| USER ID | PRINTER ID | PRINTER PERFORMANCE |
|---|---|---|
| A | a | COLOR/BOTH-SIDED/A3/Nup |
| B | b | MONOCHROMATIC/BOTH-SIDED/A4 |
| C | c | MONOCHROMATIC/SINGLE-SIDED/A4 |
| ... | ... | ... |

FIG. 5

| GROUP ID | MEMBER LIST | CURRENT CHAT PARTICIPANT |
|---|---|---|
| GROUP 1 | A, B, C | A, B, C |
| GROUP 2 | B, D, E, F | E, F |
| ... | ... | ... |

INFORMATION PROCESSING APPARATUS AND NON-TRANSITORY COMPUTER READABLE MEDIUM THAT RECOGNIZE A PRINT COMMAND ON A GROUP CHAT TO OUTPUT DATA FROM IMAGE FORMING APPARATUSES ASSIGNED TO EACH USER

CROSS-REFERENCE TO RELATED APPLICATIONS

This application is based on and claims priority under 35 USC 119 from Japanese Patent Application No. 2018-178263 filed Sep. 25, 2018.

BACKGROUND

(i) Technical Field

The present disclosure relates to an information processing apparatus and a non-transitory computer readable medium.

(ii) Related Art

There are software robots (hereinafter referred to as "chatbots" or simply as "bots") that recognize a command to operate an apparatus from a user's comment on a chat service and operate the apparatus. For example, there are systems in which a user registers a bot for controlling a printer in a chat service and gives a print command to the bot on a one-to-one chat with the bot. In such a conventional system, a printer corresponding to the user is registered in the bot, and printing is performed by the registered printer when the user gives a print command to the bot.

The information offering system disclosed in Japanese Unexamined Patent Application Publication No. 2015-179519 allows a user to add, as a friend, an interpretation software robot that is a virtual friend realized by an artificial intelligence software program on an instant messaging application executed on a user terminal. When the user enters and sends a message in a first language in a talk session with the interpretation software robot, the information offering system generates a message translated in a second language and offers the generated message to the user and a communication partner together with the message written in the first language or instead of the message written in the first language.

In a case where contents of a message analyzed by an analyzing unit are a control command for a predetermined electric apparatus, the control server disclosed in Japanese Unexamined Patent Application Publication No. 2015-144027 writes a message including an expression that reminds a user that a subject of the message is the electric apparatus on an electric message board in response to the control command.

In the method disclosed in Japanese Unexamined Patent Application Publication No. 2014-225268 that is an information offering method using an instant messaging application, a message sent to a software robot by a user through a messaging application on a user terminal is received, a response is retrieved from a database by using the message as a query, and the response is sent to the user through the messaging application on the user terminal.

SUMMARY

Assume that a bot for operating an output device participates a group chat. In this case, an output device common to the group for the group chat may be registered in the bot. In this case, upon receipt of a command to output data on the group chat, the bot causes the output device to output the data. However, in some cases, users participating in the group chat are in places remote from each other, and the output device registered in the bot is not necessarily convenient for all users. For example, a user who is not close to the output device registered in the bot cannot get the output of the data from the output device.

Aspects of non-limiting embodiments of the present disclosure relate to providing a mechanism that allows data to be output from output devices convenient for individual destination users including a user who has not given an output command in response to a comment of an output command given by a single user participating in a group chat, as compared with a method in which an output device common to a group is registered in a bot participating in a group chat.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a memory in which information on output devices corresponding to plural users participating in a group chat is stored; and a controller that, in a case where any one of the plural users gives a post indicative of an output command to output data on the group chat, performs control for outputting the data from output devices corresponding to one or more output destination users including a user who has not given the post indicative of the output command among the plural users in accordance with the information stored in the memory.

BRIEF DESCRIPTION OF THE DRAWINGS

An exemplary embodiment of the present disclosure will be described in detail based on the following figures, wherein:

FIG. 4 is an explanatory view of a user information table;

FIG. 5 is an explanatory view of a group information table;

DETAILED DESCRIPTION

An exemplary embodiment of the present disclosure is described with reference to the drawings by taking a chatbot that offers a print service in accordance with a message from a user as an example of a chatbot.

First Exemplary Embodiment

Figure 1:
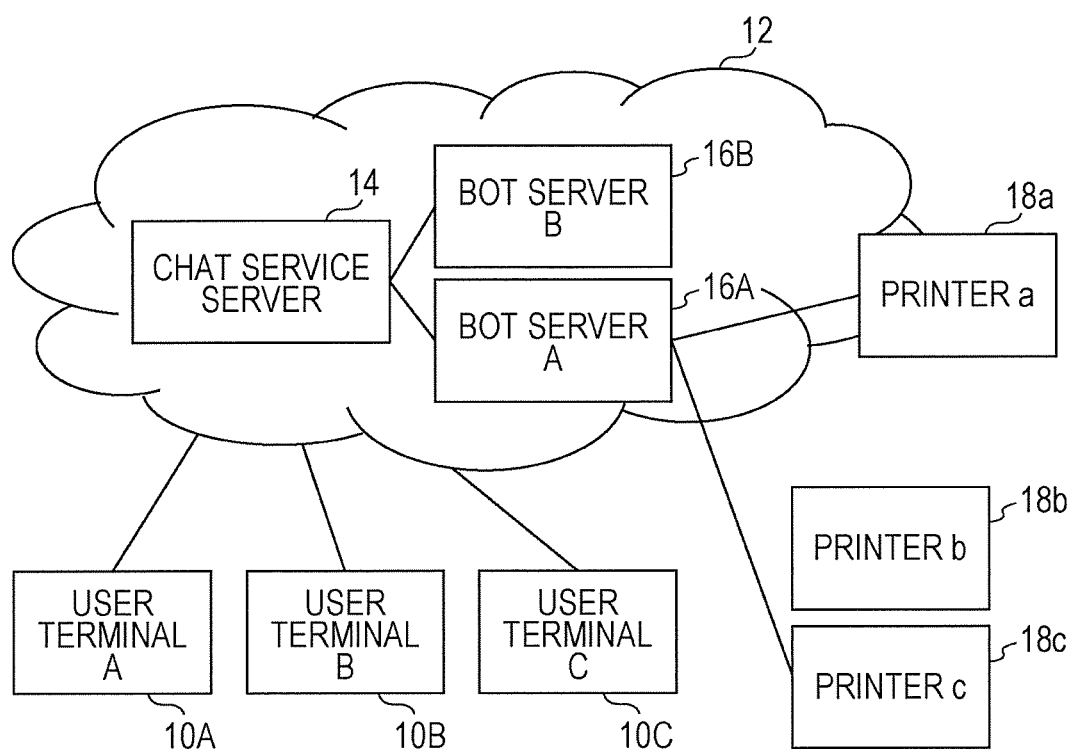
FIG. 1 illustrates a system configuration according to a first exemplary embodiment.

FIG. 1 illustrates an overall configuration of a message service system according to an exemplary embodiment. The message service system includes user terminals A (10A) to C (10C), a chat service server 14, bot servers A (16A) and B (16B), and printers a (18a) to c (18c).

The user terminals A (10A) to C (10C) are terminals used by users of a message service and information terminals such as smartphones, tablet terminals, and personal computers (PCs). Although three user terminals, i.e., the user terminal A (10A), the user terminal B (10B), and the user terminal C (10C) are illustrated in FIG. 1, the number of user terminals is not limited. The users access the chat service server 14 on a cloud 12 by operating the user terminals A (10A) to C (10C) and exchange a message and the like with other users or a chatbot. In the following description, it is assumed that a user A operates the user terminal A, a user B operates the user terminal B, and a user C operates the user terminal C. The user terminals A (10A) to C (10C) and the chat service server 14 are connected so as to be capable of transmitting and receiving data over a wired or wireless communication network. The communication network is, for example, a public line such as the Internet but may be a dedicated line.

The chat service server 14 is a cloud server on the cloud 12 and is a server that offers a chat service. The chat service server 14 is constituted by one or more server computers. The chat service server 14 performs processing concerning exchange of a message in general such as processing for transmitting and receiving a message or the like to and from the user terminals A (10A) to C (10C) and processing for displaying a display screen for message transmission and reception. The chat service server 14 can not only process exchange of a message or the like between two members, but also create a group made up of three or more members and process exchange of a message or the like in the group. Hereinafter, exchange of a message or the like between two members and a place of the exchange are referred to as a one-to-one chat or a peer-to-peer chat. Furthermore, exchange of a message or the like in a group made up of three or more members and a place of the exchange are referred to as a group chat. The chat service server 14 holds, for each group chat, a list of identifiers (e.g., user IDs) of members belonging to the group chat. Furthermore, the chat service server 14 processes exchange of a message or the like with chatbots offered by the bot servers 16A and 16B in cooperation with the bot server A (16A) and the bot server B (16B). In the present exemplary embodiment, a chatbot is handled as one of "members" who exchange a message or the like on a chat. That is, the members include both a user associated with an actual person and a chatbot. Exchange of a message or the like between a user and a chatbot include exchange of a message or the like between a single user and a chatbot and exchange of a message or the like among plural users and a chatbot. That is, a chatbot sometimes participates in a one-to-one chat with a user and sometimes participates in a group chat. A chatbot participates in a chat, for example, in response to invitation from a user participating the chat.

The concept of a message or the like exchanged between members on a chat encompasses an image representing posted content such as a "stamp", a uniform resource locator (URL), and the like in addition to a message expressed as a character string. Such a message or the like is sometimes referred to as a "post" on a chat. The "post" in this case means information posted on a chat. Furthermore, a chat member's act of entering such a message or the like on a chat is also referred to as "post". The "post" in this case is an act. Examples of the "posting act" on a chat include an act of writing a text message on the chat, an act of sending a stamp, an act of pasting a URL, and an act of entering data such as a file on the chat (e.g., an act of selecting data to be posted and then pressing a post button).

A software robot program for a chatbot that exchanges a post with a user is installed in the bot server A (16A) and the bot server B (16B), and the bot server A (16A) and the bot server B (16B) execute the program. The bot server A (16A) and the bot server B (16B) may be operated by a messenger service account of a company, a shop, or the like allocated for advertisement or commercial use.

The bot server A (16A) and the bot server B (16B) cooperate with the chat service server 14 through a specific application programming interface (API), exchanges a post such as a message with a user, and returns a message automatically in response to a message from the user. The specific API is an API for using the chat service server 14. The format of the API is not limited. For example, the API is an API of a Javascript (Registered Trademark) Object Notation (JSON) format, and JSON data of a specified format is sent to a specific URL of the chat service server 14 by using POST or GET, and a result is returned as JSON-format data.

In a case where a message from a user includes an operation command, the bot server A (16A) and the bot server B (16B) execute specific service content in accordance with the operation command. In the present exemplary embodiment, in a case where a message from a user includes a print command, the bot server A (16A) functions as a "print bot" that performs print processing by causing the printer a (18a), the printer b (18b), or the printer c (18c) to operate in accordance with this print command. Meanwhile, the bot server 16B can offer any service in accordance with an operation command from a user. Although two bot server A (16A) and bot server B (18B) are illustrated in FIG. 1, the number of bot servers is not limited. Plural chatbots may be constituted by a single bot server or a single chatbot may be constituted by plural bot servers.

The bot server A serving as a chatbot (or a print bot) executes print processing by driving the printer a, b, or c in accordance with setting information concerning operation of a software robot program that is registered in advance for each user. In the present exemplary embodiment, a printer to be used can be registered for each user in a chatbot, and in a case where the chatbot receives a print command in which a print output destination is designated by a user name (or a user ID), the chatbot causes a printer registered in association with the user name (a "registered printer" for the user) to execute print processing indicated by the print command.

The printers a (18a) to c (18c) execute print processing in response to a command from the bot server A.

Figure 2:
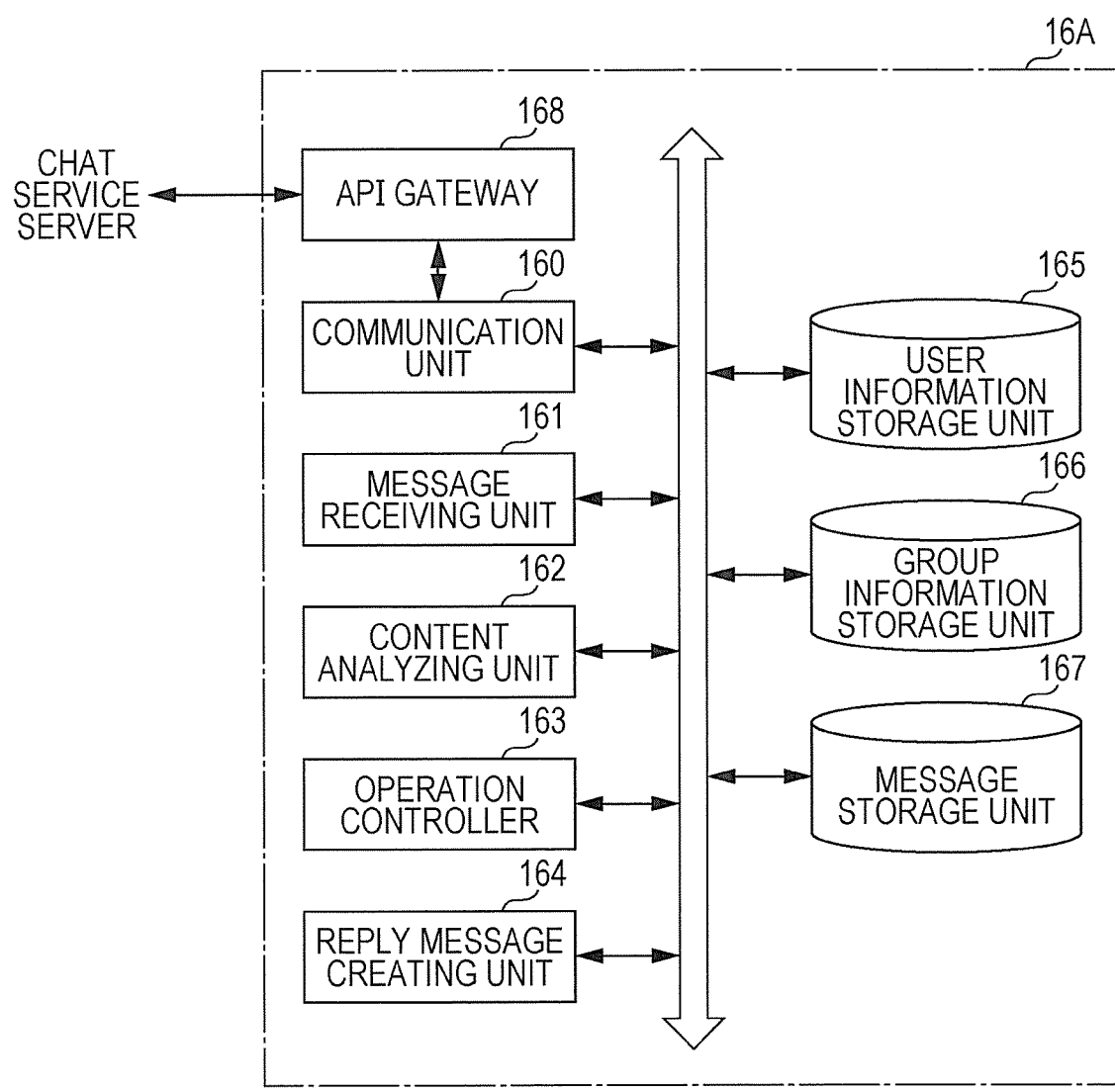
FIG. 2 is a functional block diagram according to the first exemplary embodiment.

FIG. 2 is a functional block diagram of the bot server A (16A). The bot server A includes, as functional blocks, a communication unit 160, a message receiving unit 161, a content analyzing unit 162, an operation controller 163, a reply message creating unit 164, a user information storage unit 165, a group information storage unit 166, a message storage unit 167, and an API gateway 168.

The communication unit 160 communicates with the chat service server 14 and the printers a to c. The communication unit 160 exchanges a post by communicating with the chat service server 14 through the API gateway 168. The communication unit 160 supplies, to the message receiving unit 161, a post received from the chat service server 14 through the API gateway 168, i.e., a post from the user terminals A to C. The communication unit 160 sends, to the chat service server 14 (i.e., to the user terminals A to C), a reply such as a message created by the reply message creating unit 164 through the API gateway 168. Furthermore, the communication unit 160 gives a print command to the printers a to c so as to drive the printers a to c in accordance with a command from the operation controller 163.

The message receiving unit 161 receives a post from the communication unit 160 and supplies the post to the content analyzing unit 162. Posts from a user on a chat include a print command and a reply to a question from a chatbot. The message receiving unit 161 causes received posts to be sequentially stored in the message storage unit 167.

The content analyzing unit 162 analyzes contents of a message expressed as at least a character string among the received posts and supplies the analyzed contents to the operation controller 163. Specifically, the content analyzing unit 162 recognizes a user identifier (user ID) included in the received message and executes parsing by extracting a text part included in the message. The parsing method is not limited. For example, an entered message is broken into morphemes, and then a noun, an adjective, a verb, and an interrogative pronoun are extracted as keywords. In a case where the text part of the message includes an operation command, the content analyzing unit 162 analyzes contents of the operation command and supplies the analyzed contents to the operation controller 163. Examples of an operation command in the present exemplary embodiment include a print command for the printers a to c, a command to start or end a conference mode (details thereof will be described later), a command indicating that printing is unnecessary, and a command as a reply to a question of a chatbot. In a case where the received post is a stamp, the content analyzing unit 162 acquires meaning information associated with the stamp. Each stamp is given meaning represented by the stamp, and a computer for chat processing can acquire meaning of each stamp from the stamp itself or from the chat service server.

In a case where a print command from a user is recognized on the basis of an analysis result obtained by the content analyzing unit 162, the operation controller 163 gives the print command to the printers a to c through the communication unit 160. In particular, in a case where a print command is received on a group chat, the operation controller 163 performs control for causing a registered printer of each member participating in the group chat to execute printing.

Furthermore, in a case where a user posts information indicative of a print command on a group chat (e.g., posts a message indicative of a print command on the group chat) while omitting designation of an output destination, a chatbot according to the present exemplary embodiment has a mode of printing a target document of the print command from registered printers of all users (hereinafter referred to as participants) currently participating in the group chat. This mode is referred to as a conference mode. In general, the registered printers of the participants of the group chat have different levels of performance. Furthermore, some participants may not need printing of the document indicated by the print command in the conference mode. Furthermore, there are cases where some participants have not registered a printer in a chatbot. Furthermore, output from the registered printers may be inconvenient for some participants who have registered printers but are somewhere outside places where the registered printers are placed when participating in the group chat. In order to cope with such circumstances of the individual participants, the operation controller 163 causes the reply message creating unit 164 to post a message indicative of a guide or a question on a group chat and changes print settings, need for printing, and the like in accordance with a reply from the participant to the message. Since all members registered in the group chat are not always participating in the group chat, participants of the group chat at a certain point in time are a subset of all members of the group chat.

The reply message creating unit 164 creates post information indicative of contents of a reply in accordance with the analysis result obtained by the content analyzing unit 162 and a command from the operation controller 163 and sends the post information to the chat service server 14 through the communication unit 160.

The user information storage unit 165 stores therein, as a table, information on users using the chat service server 14, especially information on users using the chatbot realized by the bot server A. The chatbot is given a specific account on a chat service realized by the chat service server 14, and use of the chatbot is determined when a user performs a certain operation (e.g., an operation that means "friend" registration) while designating this account. Examples of the information on the users stored in the user information storage unit 165 include user IDs and information on registered printers of the users. Furthermore, information on an authority of each user may be stored in the user information storage unit 165.

The group information storage unit 166 stores therein information on a group of each group chat managed by the chat service server 14. The information on a group include an identifier (hereinafter referred to as a group ID) of the group and a list of user IDs of members of the group.

The message storage unit 167 stores therein, as a history, messages from users received by the message receiving unit 161.

Figure 3:
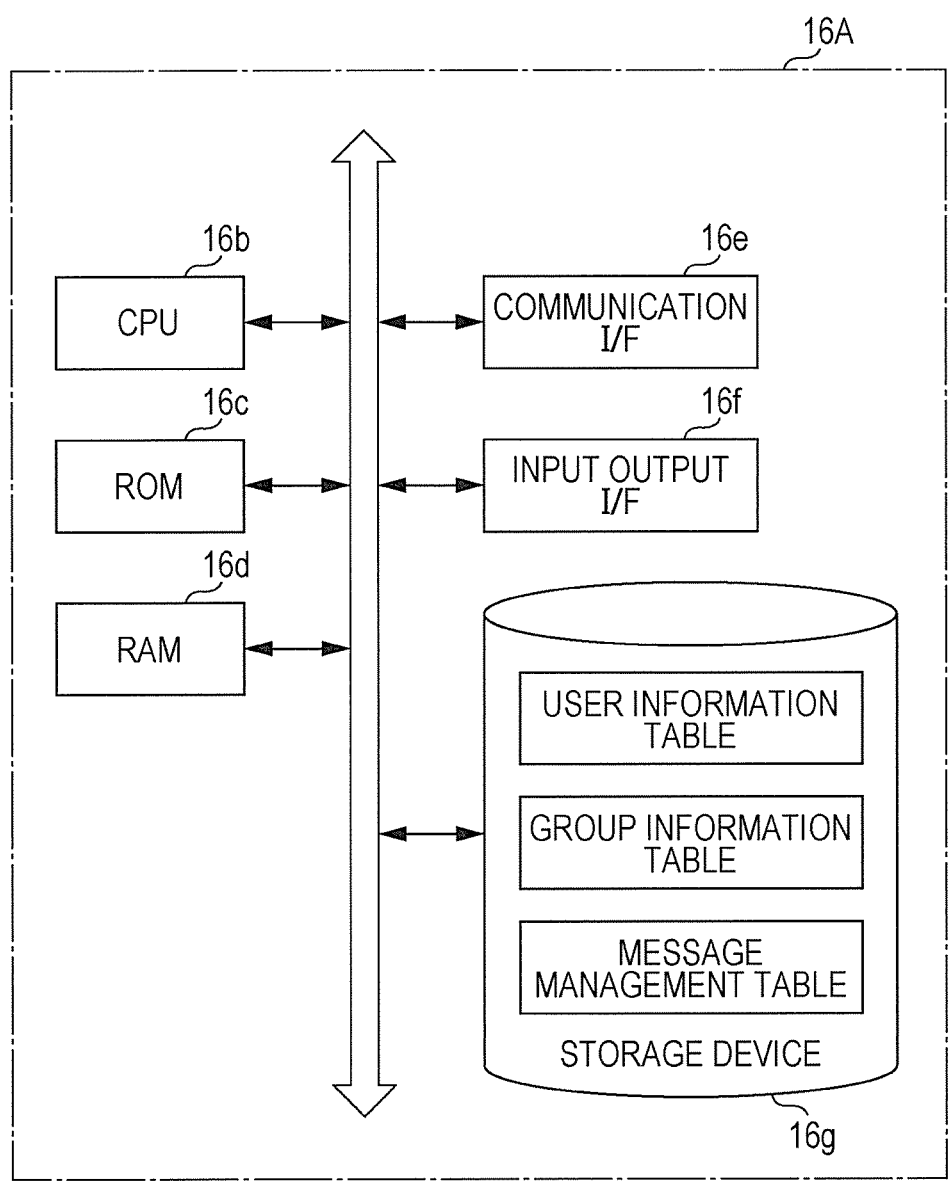
FIG. 3 is a configuration block diagram according to the first exemplary embodiment.

FIG. 3 is a block diagram illustrating a configuration of the bot server A. The bot server A is constituted by one or more server computers and includes one or more CPUs 16b, a ROM 16c, a RAM 16d, a communication interface (I/F) 16e, an input output I/F 16f, and a storage device 16g.

One or more CPUs 16b read out a bot app stored in the ROM 16c or the storage device 16g and realizes a function of a chatbot by using the RAM 16d as a working memory. That is, the CPUs 16b automatically respond to a message from a user and drive the printers a to c in accordance with an operation command in a case where the message from the user includes the operation command. The CPUs 16b realize the message receiving unit 161, the content analyzing unit 162, the operation controller 163, the reply message creating unit 164, and the API gateway 168 in FIG. 2 by executing the bot app.

The communication I/F 16e exchanges a message with the chat service server 14 and supplies a print command to the printers a to c.

The input output I/F transmits and receives data to and from an input device such as a keyboard or a mouse and an output device such as a display device.

The storage device 16g is constituted by a non-volatile memory such as a hard disk drive (HDD) or a solid state drive (SSD) and stores therein a user information table, a group information table, and a message management table in addition to the bot app. The storage device 16g realizes the user information storage unit 165, the group information storage unit 166, and the message storage unit 167 in FIG. 2.

In the present exemplary embodiment, a software robot program for realizing a chatbot is executed by a CPU, but part of the chatbot may be realized not by processing performed by execution of a program but by hardware processing. The hardware processing may be performed, for example, by using a circuit such as an ASIC or a field programmable gate array (FPGA).

FIG. 4 illustrates an example of the user information table stored in the user information storage unit 165. In this example of the user information table, an identifier (referred to as a printer ID) of a registered printer of a user and performance information ("printer performance") of the registered printer are registered in association with a user ID of each user. Examples of the printer performance include the presence or absence of color printing and both-sided printing functions, a maximum sheet size that can be printed, and the presence or absence of a Nup function (a function of laying out N (N is a positive integer) pages of print data on a single sheet of paper). A user ID used to identify a user in a chatbot may be an ID of the user in the chat service server 14 or may be an ID uniquely given by the chatbot (bot server). In the latter case, the bot server holds information on a correspondence between a user ID given to a user by the bot server and an ID of the user in the chat service server 14.

FIG. 5 illustrates an example of the group information table stored in the group information storage unit 166. In the illustrated group information table, a list (a "member list") of user IDs of users belonging to a group (i.e., members of the group) and a list (a "current chat participants") of IDs of users currently participating in a group chat of the group are registered in association with a group ID of each group (which is also an ID of a group chat corresponding to the group). The information on the member list and current chat participants is acquired from the chat service server 14.

Next, an example of control performed by a chatbot (the bot server 16A or 16B) in the present exemplary embodiment is described.

Figure 6:
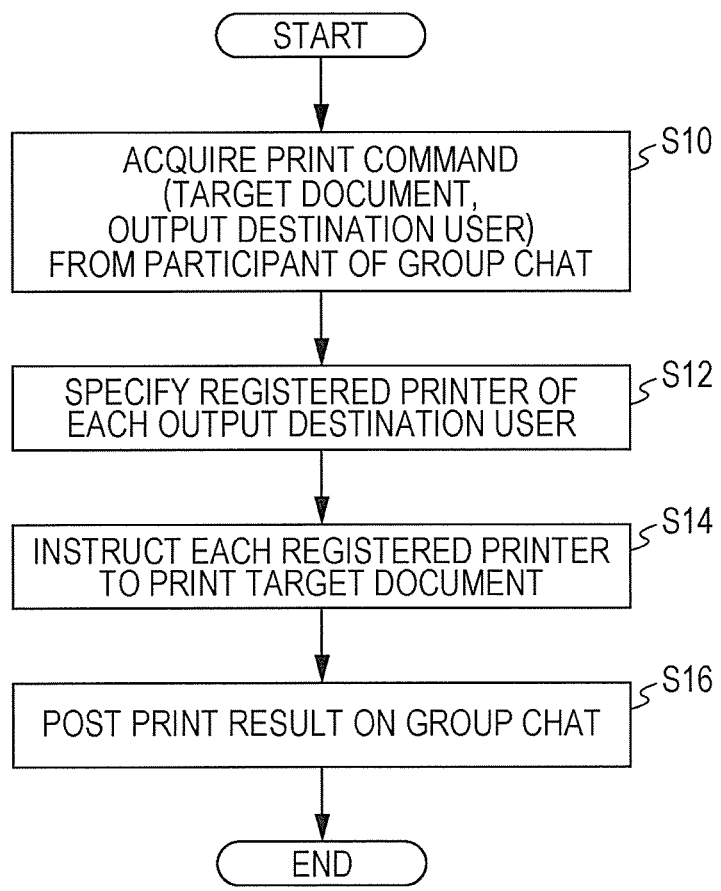
FIG. 6 illustrates a processing procedure of a chatbot.

FIG. 6 illustrates an example of a processing procedure of a chatbot. It is assumed that this chatbot is participating in a group chat.

The chatbot monitors posting of each participant on the group chat. In this monitoring processing, the chatbot (especially the content analyzing unit 162) analyzes contents of posts of the participants and detects a post indicative of an operation command (or a reply to a question of the chatbot) for the chatbot from among these posts. Assume here that the chatbot has detected a post indicative of a print command from a certain participant (a human) (S10). The post indicative of a print command explicitly or implicitly includes designation of a document to be printed (referred to as a target document) and designation of an output destination user (a participant or a member of the chat) in addition to manifestation of a desire of printing.

For example, a participant's operation of posting a document on a group chat (this operation includes entry of identification information of the document) is regarded as an implicit print command in certain settings or mode (e.g., a conference mode that will be described later) of a group chat (or a chat room that is a virtual place where the group chat is conducted). In another settings or mode, mere posting of a document is not regarded as a print command, and a post explicitly indicating a print command is needed to print the document. The "document" as used herein is a file of a format that can be output as a print image. Examples of the "document" include a document file created by an application such as a word processor or a spreadsheet and an image file of an image format of various kinds such as PNG.

In certain settings or mode (e.g., a conference mode that will be described later), in a case where an output destination user is not explicitly designated concerning a print command, all participants of the group chat are regarded to be implicitly designated as output destinations. In another settings or mode, all members of the group chat including members who are not currently participating in the group chat may be regarded to be implicitly designated as output destinations. In another settings or mode, in a case where a print command in which an output destination user is not explicitly designated is given, a user (a registered printer of the user) that has given the command is regarded as an implicit output destination.

An output destination is explicitly designated by posting a character string of a user ID of an output destination user or a name (associated with the user ID) of the user displayed on a chat in association with a print command.

Manifestation of a desire of printing, designation of a target document, and designation of an output destination user may be made in plural different posts (limited to posts of the same user) as long as they are associated with one another. Manifestation of a desire of printing, designation of a target document, and designation of an output destination user are associated, for example, by successively posting information indicative of manifestation of a desire of printing, designation of a target document, and designation of an output destination user.

Upon detection of the print command, the chatbot (especially the operation controller 163) finds, from the user information table, a registered printer of each output destination user corresponding to the command (S12).

Next, the operation controller 163 of the chatbot instructs each registered printer specified in S12 to print the target document (S14). When processing in each printer is finished, the chatbot, especially the reply message creating unit 164 posts a message indicative of a print result on the group chat (S16).

Figure 7:
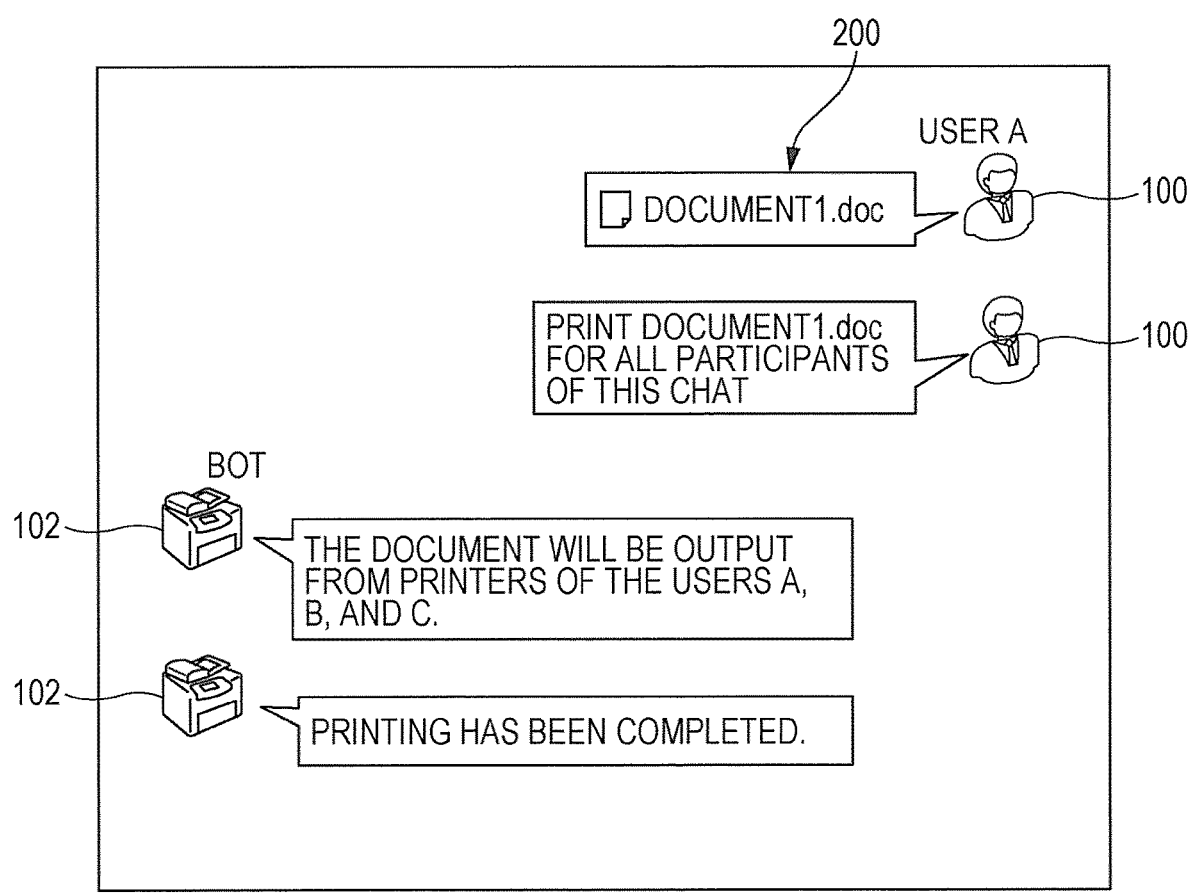
FIG. 7 illustrates an example of a screen of a group chat corresponding to the procedure of FIG. 6.

FIG. 7 illustrates an example of a dialogue on a group chat in a case where printing is performed. FIG. 7 illustrates an example of a screen of a chat service displayed on the user terminal A (indicated by the reference sign 10A) operated by the user A. The users A, B, and C and the chatbot are participating in a group chat displayed on this screen. In this example, it is assumed that the user A gives a print command to the chatbot.

On the screen of the user terminal A, a representational figure representing the user A (indicated by "UserA" in FIG. 7), for example, an icon 100 is displayed by the chat service server 14, and an icon 102 representing a chatbot realized by the bot server A is displayed by the chat service server 14. Posts 200 of the user A and the chatbot are displayed in chronological order from up to down.

In the example of FIG. 7, first, the user A posts a message indicating that a document "document1.doc" is posted and then posts a message demanding printing of the "document1.doc" for all participants of the group chat.

The chatbot causes the "document1.doc" included in the initial post of the user A to be stored, as a file that can be a target to be printed, for example, in a memory or a storage in association with the user ID of the user A. Then, the chatbot analyzes a next post of the user A and thus detects that this post indicates a print command, that a target to be printed is the "document1.doc" stored earlier, and that all participants of the group chat are output destinations. In response to this, the chatbot recognizes that current participants of the group chat are the users A, B, and C and recognizes that "all participants" are all of the users A, B, and C by using the content analyzing unit 162. Then, the chatbot posts a comment "The document will be output from printers of the users A, B, and C." on the group chat. Furthermore, the chatbot finds the registered printers a, b, and c of the users A, B, and C from the user information table (see FIG. 4), converts the "document1.doc" into data of a format that can be handled in each of the registered printers, and sends a print command including a conversion result to each of the registered printers.

Each of the registered printers prints the "document1.doc" on a sheet of paper by executing the received print command and returns a completion notification to the chatbot (bot server) when the printing is completed.

Upon receipt of the completion notification, the chatbot posts a message ("Printing has been completed.") indicative of completion of the printing on the group chat.

As described above, in the present exemplary embodiment, in a case where a user just posts information (e.g., "Print the document for all participants") by which output destination participants can be specified, print output is performed from printers of the participants even in a case where the user does not designate, as output destinations, identification information (e.g., printer names) of the registered printers of the participants of a group chat.

Processing Concerning Print Settings

Since a chat is a communication means between remote users, it is highly likely that registered printers registered by participants of a group chat are different printers and have different levels of performance.

Meanwhile, the chatbot has a function of receiving print settings (print parameters) corresponding to a print command from a user on a chat. The print settings include items such as designation of color/monochromatic printing, designation of both-sided/single-sided printing, a sheet size, Nup, and magnification (enlargement/reduction).

Therefore, there is a possibility that some registered printers of participants of a group chat cannot execute printing based on print settings associated with a print command from a user due to shortage of performance. For example, in a case where a print command designating color printing is given on a group chat but a registered printer of a user (explicitly or implicitly) designated as an output destination of the print command can perform only monochromatic printing, color printing designated by the print command cannot be performed (monochromatic printing is performed instead) by the printer, and there is a possibility that some printers do not perform printing itself.

In view of this, in the present exemplary embodiment, in a case where registered printers of output destination users of a print command given on a group chat include a printer whose performance that cannot meet designated print settings, the chatbot deals with the problem by chatting with a participant of the group chat. That is, the chatbot performs countermeasure processing such as changing print settings so that even a printer whose performance that cannot meet initial print settings can execute a print command by chatting with a participant who has given the print command or a participant designated as an output destination.

Figure 8:
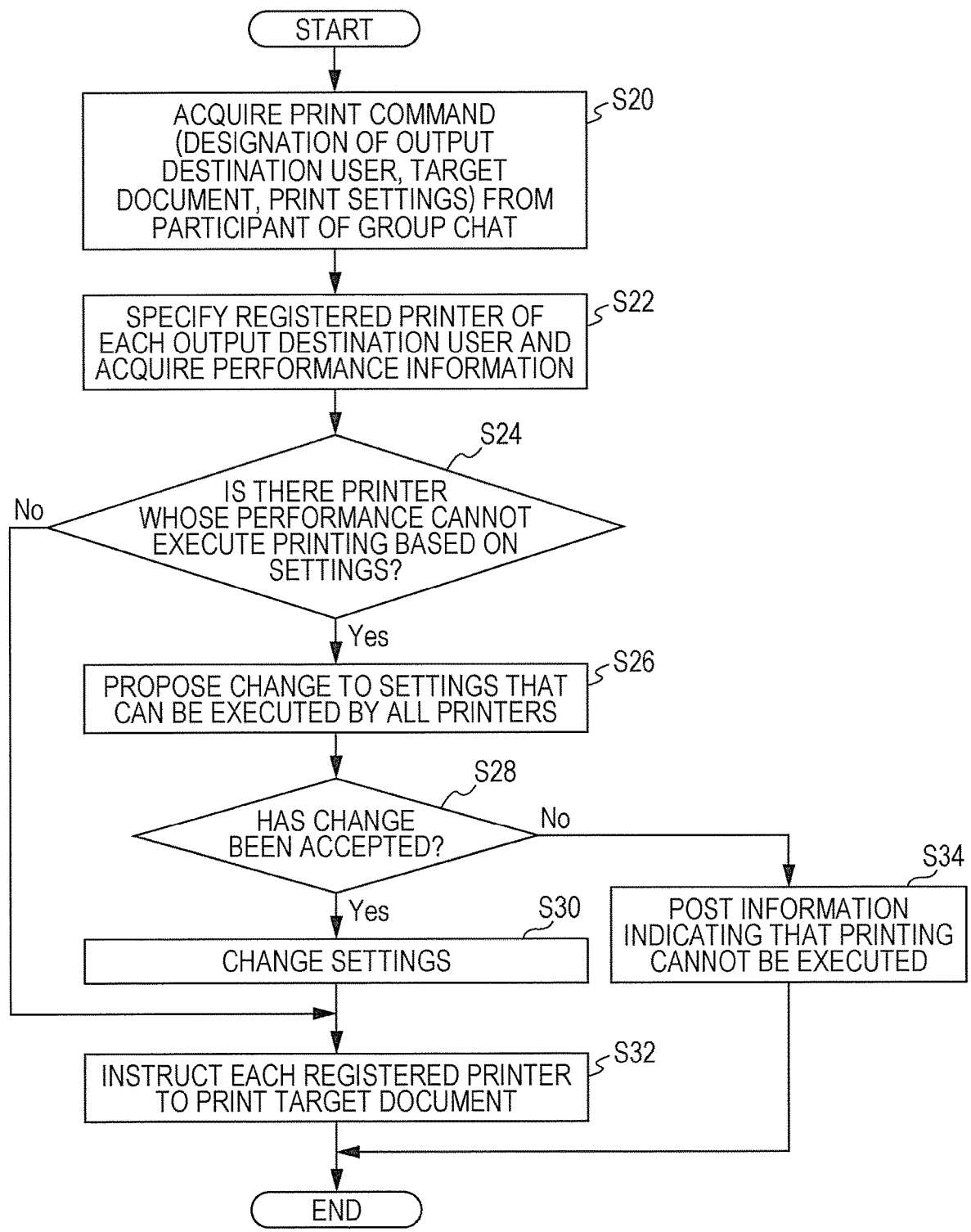
FIG. 8 illustrates a processing procedure of a chatbot including a countermeasure for a registered printer that cannot perform printing based on print settings.

FIG. 8 illustrates an example of a processing procedure of the chatbot (especially the operation controller 163).

In the procedure of FIG. 8, assume that the chatbot has detected a post indicative of a print command from a certain participant (human) of a group chat in which the chatbot is participating (S20). The post indicative of a print command explicitly or implicitly includes designation of an output destination user, designation of a target document, print settings, and the like.

The chatbot specifies registered printers of output destination users from the user information table and acquires performance information of the registered printers (S22). Next, the chatbot determines whether or not the registered printers of the output destinations include a printer whose performance cannot execute printing based on print settings by comparing the print settings and performance information of the registered printers (S24). In a case where a result of this determination is No, i.e., in a case where all of the registered printers of the output destinations have performance that can perform printing based on the print settings, the chatbot instructs each of the registered printers to print a target document based on the print settings (S32).

In a case where the result of this determination is Yes, i.e., in a case where the registered printers of the output destinations include a printer (hereinafter referred to as a "poor-performance printer) that cannot execute printing based on the print settings because of shortage of performance, the chatbot finds print settings that can be executed by all poor-performance printers of the output destinations. For example, the chatbot finds print settings that can be executed by all poor-performance printers by performing, for all of the poor-performance printers, processing for changing an item that cannot be executed by the poor-performance printer among items of the print settings designated by the user to a maximum value of a range that can be executed by performance of the poor-performance printer. The print settings thus found are print settings that can be executed by all of the registered printers of the output destinations.

The chatbot posts, on the group chat or on a one-to-one chat with a participant (hereinafter referred to as a "command giver") who has given the print command, information indicating that registered printers of the output destination participants include a printer that cannot perform printing based on the print settings designated by the command giver. Then, the chatbot posts, for the command giver on the group chat or on the one-to-one chat with the command giver, a proposal to change the print settings of the print command to print settings that can be executed by all of the found registered printers of the output destinations (S26). This post of the proposal on the group chat may include a mention for the command giver (i.e., a character string designating, as a destination of the comment, a user name of the command giver).

The command giver who has seen the post of the proposal posts a comment indicating whether or not to accept the proposal on the group chat or the one-to-one chat. The chatbot determines whether or not the post of the command giver indicates acceptance of the proposal by analyzing contents of the post (S28). In a case where the post of the command giver indicates acceptance of the proposal, the chatbot changes contents of the print settings corresponding to the print command to the ones proposed in S26 (S30) and instructs the registered printers of the output destinations to print the target document based on the changed print settings (S32).

In a case where the post from the command giver indicates refusal of the proposal in S28 or in a case where acceptance of the proposal is not posted by the command giver for a predetermined period, the chatbot posts information indicating that printing of the print command cannot be executed on the group chat (S34) and does not give a print command to the registered printers of the output destinations in the example of FIG. 8.

Figure 9:
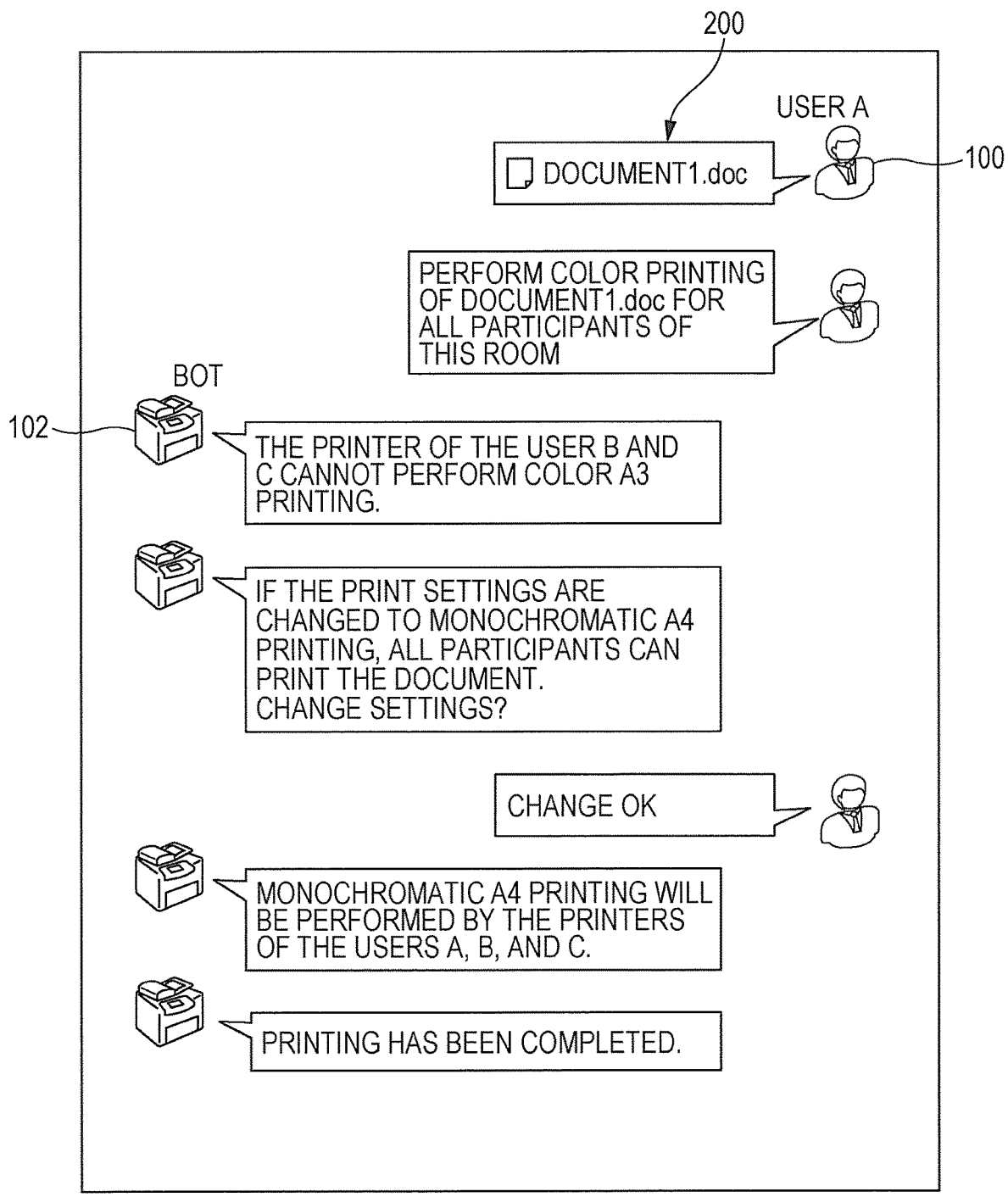
FIG. 9 illustrates an example of a screen of a group chat corresponding to the procedure of FIG. 8.

FIG. 9 illustrates an example of a dialogue on the group chat corresponding to the processing of FIG. 8. FIG. 9 illustrates an example of a screen of a chat service displayed on the user terminal A (10A) operated by the user A. The users A, B, and C and the chatbot are participating in the group chat displayed on this screen. In this example, it is assumed that the user A is a command giver.

In the example of FIG. 9, first, the user A posts a document "document1.doc" and then posts a demand for color printing of the "document1.doc" for all participants of the group chat.

The chatbot causes the document "document1.doc" included in the initial post of the user A to be stored, as a file that can be a target to be printed, for example, in a memory or a storage in association with a user ID of the user A. Furthermore, the chatbot detects that the document "document1.doc" includes an A3-size page by examining the document "document1.doc". Then, the chatbot analyzes contents of the next post of the user A and thus detects that this post indicates a print command, that the target of the printing is the document "document1.doc" stored earlier, that all participants of the group chat are output destinations, and that color printing has been designated.

In response to this, the chatbot recognizes that "all participants" are the users A, B, and C by using the content analyzing unit 162 since current participants of the group chat are the users A, B, and C. The chatbot finds the registered printers a, b, and c of the users A, B, and C from the user information table (see FIG. 4) and acquires performance information of the printers a, b, and c. Then, the chatbot determines whether or not the printers a, b, and c can execute the print settings (color printing, A3 size) designated by the command giver. In this example, it is assumed that it has been found the printers b and c do not support color printing and an A3 size. In this case, the chatbot posts a message "The printer of the user B and C cannot perform color A3 printing.", for example, on the group chat.

Furthermore, the chatbot finds that printing can be performed even by the printers b and c by changing color printing and A3 of the print settings to monochromatic printing and A4, respectively and posts a message proposing a change to monochromatic and A4 printing to the command giver, for example, a message "If the print settings are changed to monochromatic A4 printing, all participants can print the document. Change settings?" on the group chat (or a one-to-one chat with the user A who is the command giver).

The command giver (the user A in this example) posts a reply to the proposal for the chatbot on the group chat or the one-to-one chat. In the example illustrated in FIG. 9, the user A posts a message "Change OK" meaning that the proposed change of the settings is accepted on the group chat.

The chatbot determines that the earlier proposal has been accepted by analyzing the message "Change OK" of the user A and posts a message "Monochromatic A4 printing will be performed by the printers of the users A, B, and C." on the group chat. Then, the chatbot instructs the printers a, b, and c of the users A, B, and C to print the "document1.doc" based on the changed print settings corresponding to the proposal and posts information indicative of completion of the printing on the group chat when the printing in each of the printers is completed.

Next, another example of countermeasure processing performed by the chatbot in a case where registered printers of output destination users of a print command include a poor-performance printer is described with reference to FIG. 10.

In the example of FIGS. 8 and 9, in a case where there is a poor-performance printer, the chatbot proposes, to the command giver, to change print settings applied to registered printers of all output destinations to print settings that can be executed by the poor-performance printer. Meanwhile, in the example of FIG. 10, the chatbot proposes to change the print settings only for the poor-performance printer without changing the print settings for output destinations that can perform printing based on the initial print settings. In this example, the chatbot proposes, not to the command giver but to a participant who registers the poor-performance printer, to change the print settings and receives a reply to the proposal from this participant.

Figure 10:
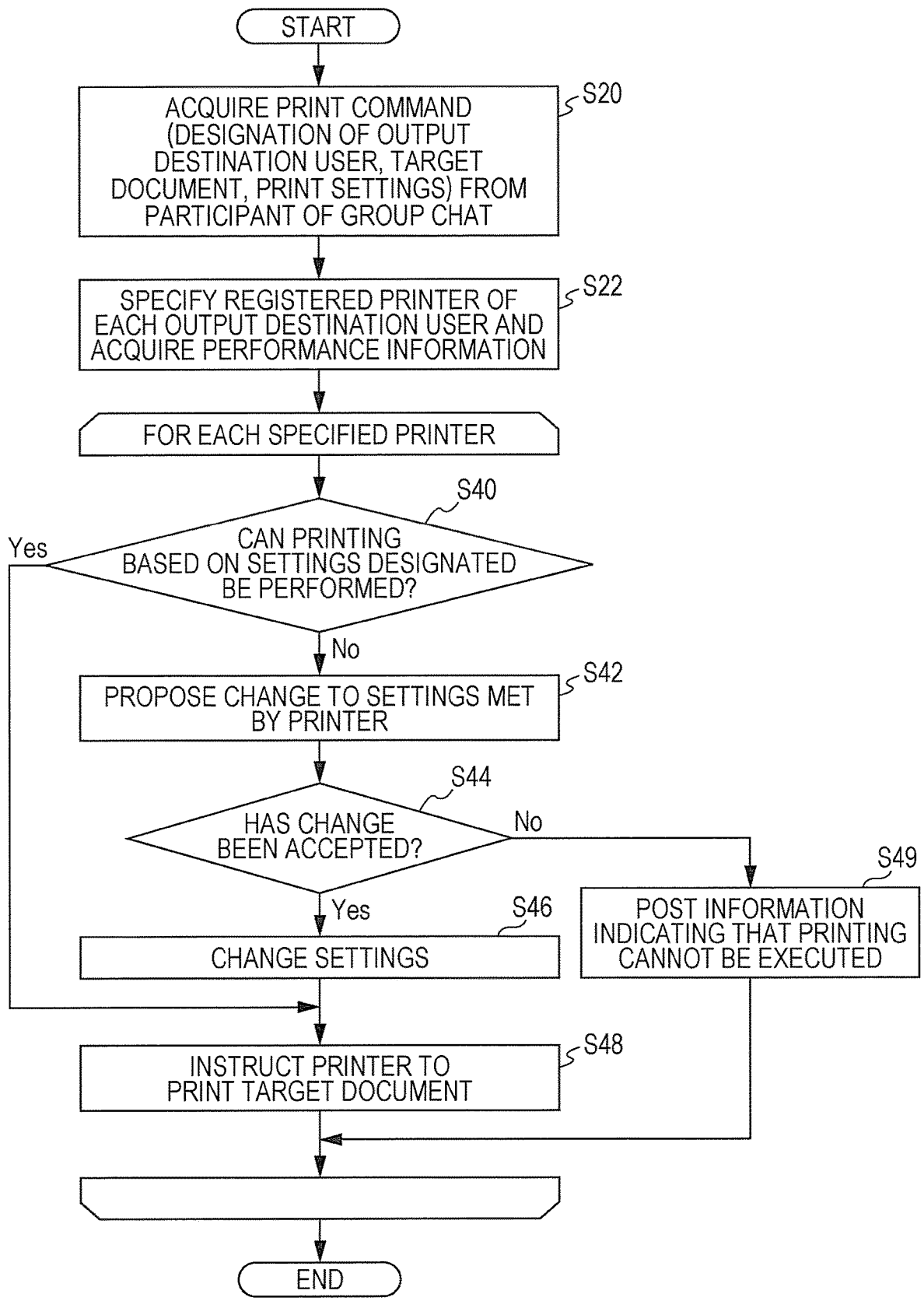
FIG. 10 illustrates another example of a processing procedure of a chatbot including a countermeasure for a registered printer that cannot perform printing based on print settings.

Steps in which the chatbot receives a print command including print settings from a participant on a group chat and acquires performance information of registered printers of output destination users (S20 and S22) in the processing procedure of FIG. 10 are identical to those in the procedure of FIG. 8. Then, the chatbot executes the processes in S40 to S49 for each registered printer of an output destination specified in S22.

That is, the chatbot determines whether or not printing based on print settings designated by a command giver can be performed by a registered printer of interest by comparing performance information of the registered printer and the print settings (S40). In a case where a result of this determination is Yes, the chatbot instructs the registered printer to print a target document based on the print settings (S48).

In a case where the result of the determination in S40 is No, the chatbot proposes, on a chat to a participant corresponding to the registered printer, to perform settings change of changing a value of each item that cannot be executed by performance of the registered printer among the print settings, for example, to a maximum value that can be executed by the performance (S42). This proposal may be given on the group chat or may be given on a one-to-one chat with the participant.

The participant replies, on the chat, to the posted proposal from the chatbot on the chat. The chatbot determines whether or not the proposal of the change of the settings has been accepted by analyzing contents of the reply (S44). In a case where the proposal has been accepted, the chatbot changes the print settings to the ones proposed in S42 (S46) and instructs the registered printer to print the target document based on the changed print settings (S48). In a case where it is determined that the proposal of the change has not been accepted in S44, the chatbot posts information indicating that printing is cannot be performed for the participant corresponding to the registered printer on the group chat or the one-to-one chat (S49).

Figure 11:
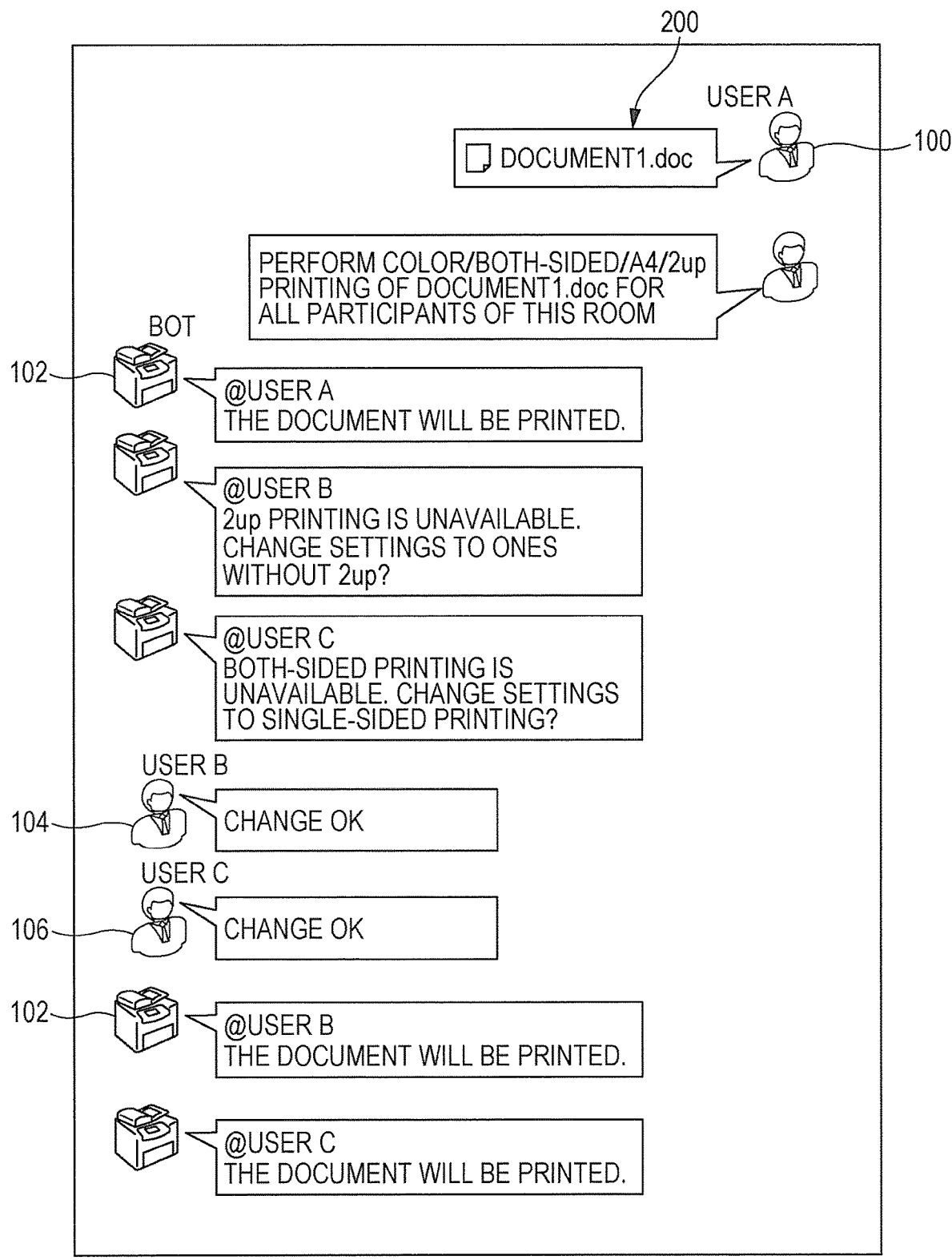
FIG. 11 illustrates an example of a screen of a group chat corresponding to the procedure of FIG. 10.

FIG. 11 illustrates an example of a dialogue on the group chat corresponding to the processing of FIG. 10. FIG. 11 illustrates an example of a screen of a chat service displayed on the user terminal A (10A). The users A, B, and C and the chatbot are participating in the group chat displayed on this screen, and it is assumed that the user A is a command giver.

In the example of FIG. 11, the user A posts a document "document1.doc" and then posts a demand for color, both-sided, A4, and 2up printing of the "document1.doc" for all participants of the group chat.

The chatbot recognizes, from these posts of the user A, a print command for printing the "document1.doc" based on the print settings "color, both-sided, A4, and 2up".

In response to this, the chatbot recognizes that "all participants" are the users A, B, and C by using the content analyzing unit 162 since current participants of the group chat are the users A, B, and C. Furthermore, the chatbot finds the registered printers a, b, and c of the users A, B, and C from the user information table and acquires performance information of the printers a, b, and c. Then, the chatbot determines whether or not the printers a, b, and c can execute the print settings designated by the command giver. In this example, the printer a has performance that can perform printing based on the print settings, but the printer b does not support only 2up among the print settings and the printer c does not support only both-sided printing.

In this case, the chatbot posts a message "The document will be printed." for the user A, for example, in the form of a mention on the group chat and instructs the printer a to perform printing based on the print settings.

Furthermore, the chatbot posts a message of a proposal "2up printing is unavailable. Change settings to ones without 2up?" for the user B on the group chat since printing can be performed by the printer b by cancelling designation of 2up among the print settings. Furthermore, the chatbot posts a message of a proposal "Both-sided printing is unavailable. Change settings to single-sided printing?" for the user C on the group chat since printing can be performed by the printer c by changing both-sided printing among the print settings to single-sided printing.

In the example illustrated in FIG. 11, the user B (indicated by an icon 104) and the user C (indicated by an icon 106) post a reply "change OK" on the group chat.

In response to these replies, the chatbot posts a message notifying the users B and C that printing will be executed and instructs the printers b and c to execute printing based on the changed print settings.

In the example described with reference to FIGS. 10 and 11, the chatbot receives a reply to a proposal concerning a poor-performance printer from a user who uses the poor-performance printer as a registered printer but may receive the reply from an command giver instead.

Next, still another example of countermeasure processing performed by the chatbot in a case where registered printers of output destination users of a print command include a poor-performance printer is described with reference to an example of a chat screen of FIG. 12.

This example is similar to the example described with reference to FIGS. 10 and 11. A difference is that the chatbot has a "bot entrustment" function. That is, in the example described with reference to FIG. 12, a user can entrust the chatbot with a change of settings of a poor-performance printer without considering the change of the settings by himself or herself.

In this example, the user A posts a document "document1.doc" and then posts a demand for color, both-sided, A3, and 2up printing of the "document1.doc" for all participants of the group chat.

The chatbot recognizes, from these posts of the user A, a print command for printing the "document1.doc" based on the print settings "color, both-sided, A3, and 2up".

In response to this, the chatbot recognizes that "all participants" are the users A, B, and C by using the content analyzing unit 162 since current participants of the group chat are the users A, B, and C. Furthermore, the chatbot finds the registered printers a, b, and c of the users A, B, and C from the user information table and acquires performance information of the printers a, b, and c. Then, the chatbot determines whether or not the print settings designated by the command giver can be executed by the printers a, b, and c. In this example, the printer a has performance that can perform printing based on the print settings, but the printer b does not support A3 and 2up among the print settings and the printer c does not support color, both-sided, A3, and 2up.

In this case, the chatbot posts a message "The document will be printed by the printer of the user A." on the group chat and instructs the printer a to perform printing based on the print settings.

Furthermore, as for the printer b, the chatbot posts an inquiring message "A3 and 2up printing is unavailable. Change settings?" for the user B on the group chat (or on a one-to-one chat). Furthermore, as for the printer c, the chatbot posts an inquiring message "color, both-sided, A3, and 2up printing is unavailable. Change settings?".

Figure 12:
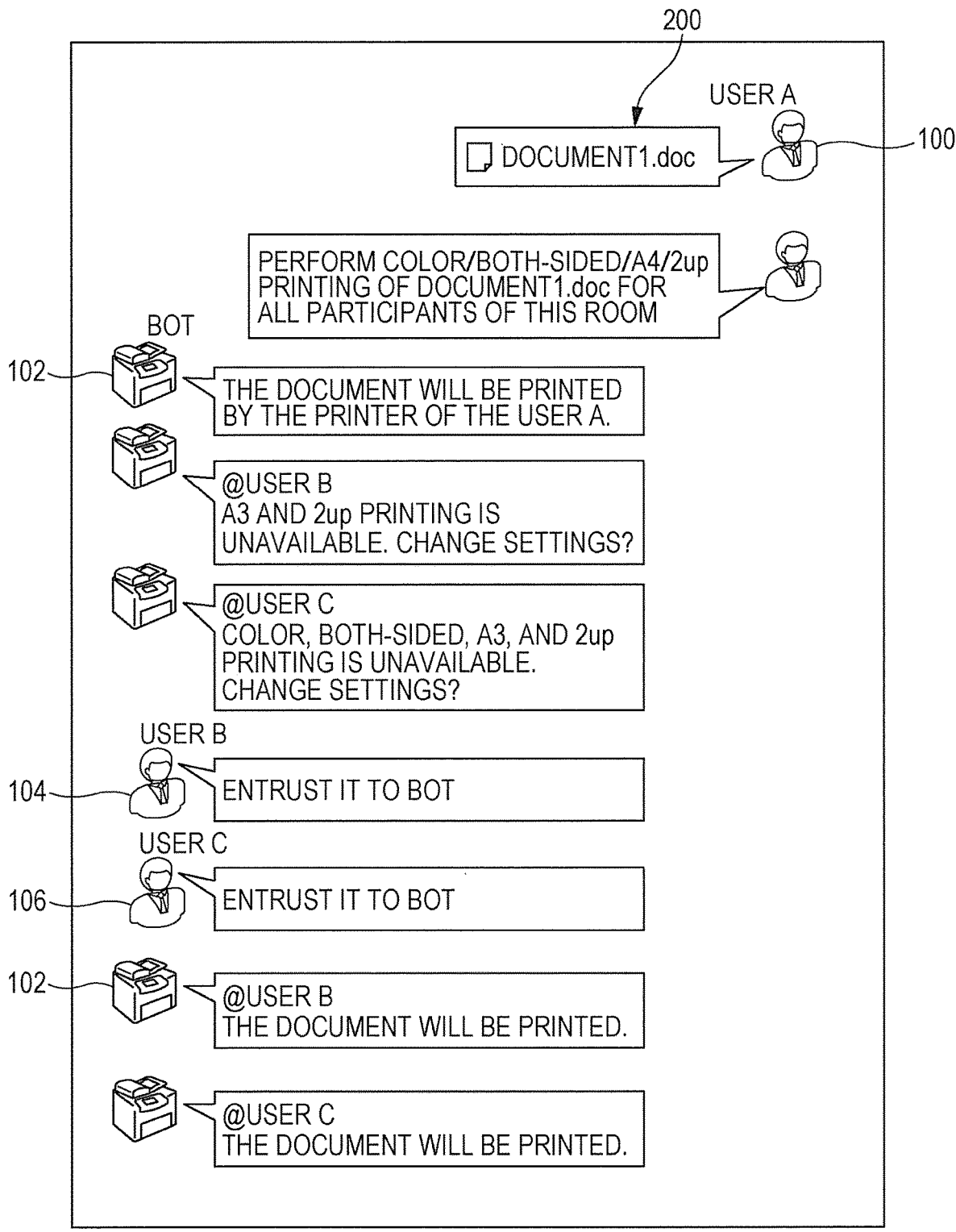
FIG. 12 illustrates an example of a screen of a group chat in another example of processing of a chatbot including a countermeasure for a registered printer that cannot perform printing based on print settings.

In the example illustrated in FIG. 12, the user B and the user C posts a reply "Entrust it to Bot" to these inquiries on the group chat.

In response to these replies, the chatbot changes settings "A3, 2up" of the printer b to A4 and no Nup that are supported by the printer b and changes settings "color, both-sided, A3, and 2up" of the printer c to settings "monochromatic, single-sided, A4, and no Nup" that are supported by the printer c. Then, the chatbot posts a message "The document will be printed by the printer of the user B" and a message "The document will be printed by the printer of the user C" and instructs the printers b and c to perform printing based on the changed print settings.

Conference Mode

For example, there are various scenes where a group chat of a chat service for business is used such as business communication between departments and a conference for business. In a case where a conference is conducted on a group chat, it is considered that a document printed on the chat is often a conference material for all participants of the conference. Conversely, in a scene where usual business communication that is not a conference is performed on a group chat, whether or not to print a document for all participants of the chat depends on a case.

As described above, various scenes where a group chat include cases where output destinations of a print command should be all participants or members of the chat and cases where an output destination of a print command should be designated individually.

In a case (e.g., a conference) where it is considered that all participants or members should be print output destinations, command giver's burden is lessened if the command giver need not designate output destinations individually or designate, for example, "all participants" as output destinations.

In view of this, in the present exemplary embodiment, the chatbot has a specific mode in which all participants or members of a group chat are regarded as output destinations in a case where a command giver does not explicitly designate an output destination. Hereinafter, the specific mode is referred to as a "conference mode".

Furthermore, there are cases where some participants do not need print output for individual reasons even in a case where all participants are regarded as output destinations of a print command on a group chat. In view of this, in this example, in a case where a print command is given in a conference mode, a command indicating that printing is unnecessary is accepted from individual participants.

When any one of participants makes a comment ("declaration of start of a conference") indicative of start of a conference mode on a group chat, the operation controller 163 of the chatbot detects this and shifts its mode to a conference mode. The declaration of start of a conference can be made by any member of the group chat or can be made by one or more specific persons preset in a chat room of the group chat among the members.

During the conference mode, in a case where a print command in which an output destination is not explicitly designated is given, the chatbot regards all current participants of the group chat as output destinations of the print command as described above. In another example, the chatbot may regard all members (including members that are not currently participating) of the group chat as output destinations of the print command in a case where output destinations are not explicitly designated. Whether all participants are regarded as output destinations of the print command or all members are regarded as output destinations of the print command may be settable as one of setting items of a chat room of the group chat. Furthermore, the setting may be accepted on the group chat.

In this example, during the conference mode, when a document is posted on a group chat, the chatbot automatically regards the posting of the document as a print command of the document. That is, in this example, it is unnecessary to explicitly make a comment indicative of a print command of the posted document.

Furthermore, when any one of the participants makes a comment (referred to as a "declaration of end of the conference") indicative of end of the conference mode on the group chat, the chatbot detects this and ends the conference mode. A mode of the chatbot that is not the conference mode is referred to as a usual mode. The declaration of end of a conference can be made by any member of the group chat or can be made by one or more specific persons preset in a chat room of the group chat among the members.

During the usual mode, the chatbot may inquire output destinations from the command giver on the group chat or on a one-to-one chat with the command giver in a case where print output destinations are not explicitly designated. In another example, the chatbot may regard a registered printer of the command giver as an output destination in a case where print output destinations are not explicitly designated. A method for finding an output destination in a case where an output destination is not explicitly designated may be settable in the chatbot.

During the usual mode, the chatbot does not instantly regard posting of a document as a print command. Note, however, that the chatbot may be set so as to regard posting of a document as a print command even in the usual mode.

Figure 13:
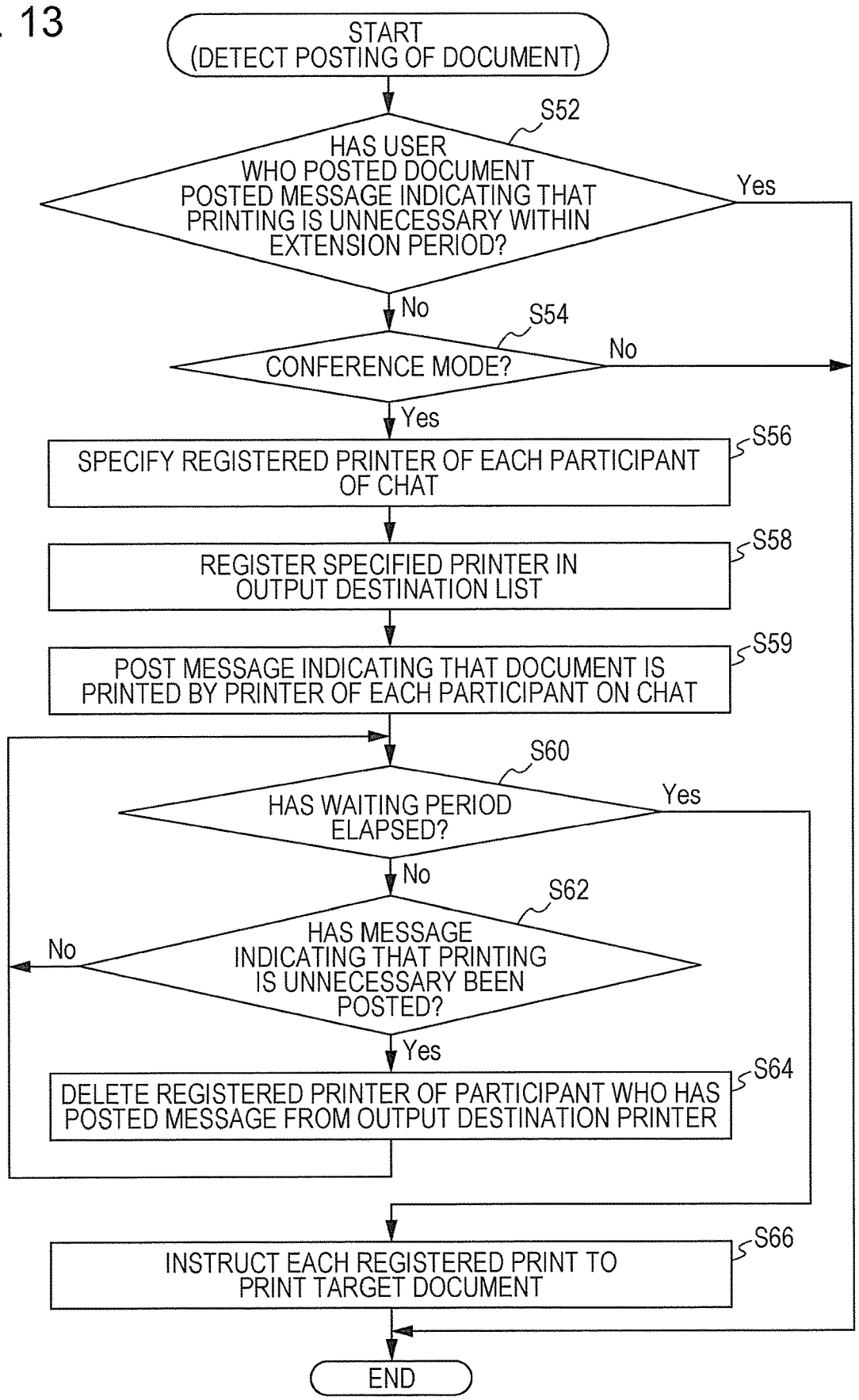
FIG. 13 illustrates a processing procedure of a chatbot including processing in a conference mode.

FIG. 13 illustrates a processing procedure of the chatbot in a case where a document is posted on a group chat. This procedure starts in a case where a document is posted from any user on a group chat.

Upon detection of posting of a document on a group chat in which the chatbot is participating, the chatbot activates a timer that counts an extension period of a predetermined length. When the chatbot detects that the user who posted the document has posted a message indicating that printing is unnecessary on the group chat by a time at which it is found by the timer that the extension period has elapsed (in a case where a result of the determination in S52 is Yes), the chatbot does not perform processing for printing the document. In this case, the chatbot finishes the series of processing and waits for posting of a next document.

In a case where the result of the determination in S52 is No, the chatbot determines whether or not a current mode is a conference mode (S54). In a case where the current mode is not a conference mode, the chatbot finishes the processing without doing anything. Then, in a case where a message indicative of a print command targeted at the document is posted on the group chat, the chatbot outputs the document from a registered printer of a user designated as an output destination of the print command.

In a case where it is determined in S54 that the current mode is a conference mode, the chatbot specifies participants currently participating in the group chat by referring to the group information table (the group information storage unit 166) (S56). Then, the chatbot finds registered printers of the specified participants from the user information table (i.e., the user information storage unit 165) and then registers pairs of the participants and the registered printers in an output destination list temporarily prepared on a memory (S58).

Next, the chatbot posts, on the group chat, a message indicating that the document is printed from the registered printers of the current participants (S59). Then, the chatbot waists for start of printing for a predetermined waiting period (S60).

In a case where a participant of the group chat does not need print output of the document, the participant posts a message indicating that printing is unnecessary during the waiting period on the group chat. The chatbot monitors whether or not a message indicating that printing is unnecessary has been posted on the group chat (S62), and upon detection of posting of a message indicating that printing is unnecessary, the chatbot deletes a pair of the participant who has posted the message and a corresponding registered printer from the output destination list (S64).

When the waiting period elapses, the chatbot sends a print command to a registered printer included in each pair of participant and registered printer included in the output destination list at this point in time (S66).

Figure 14:
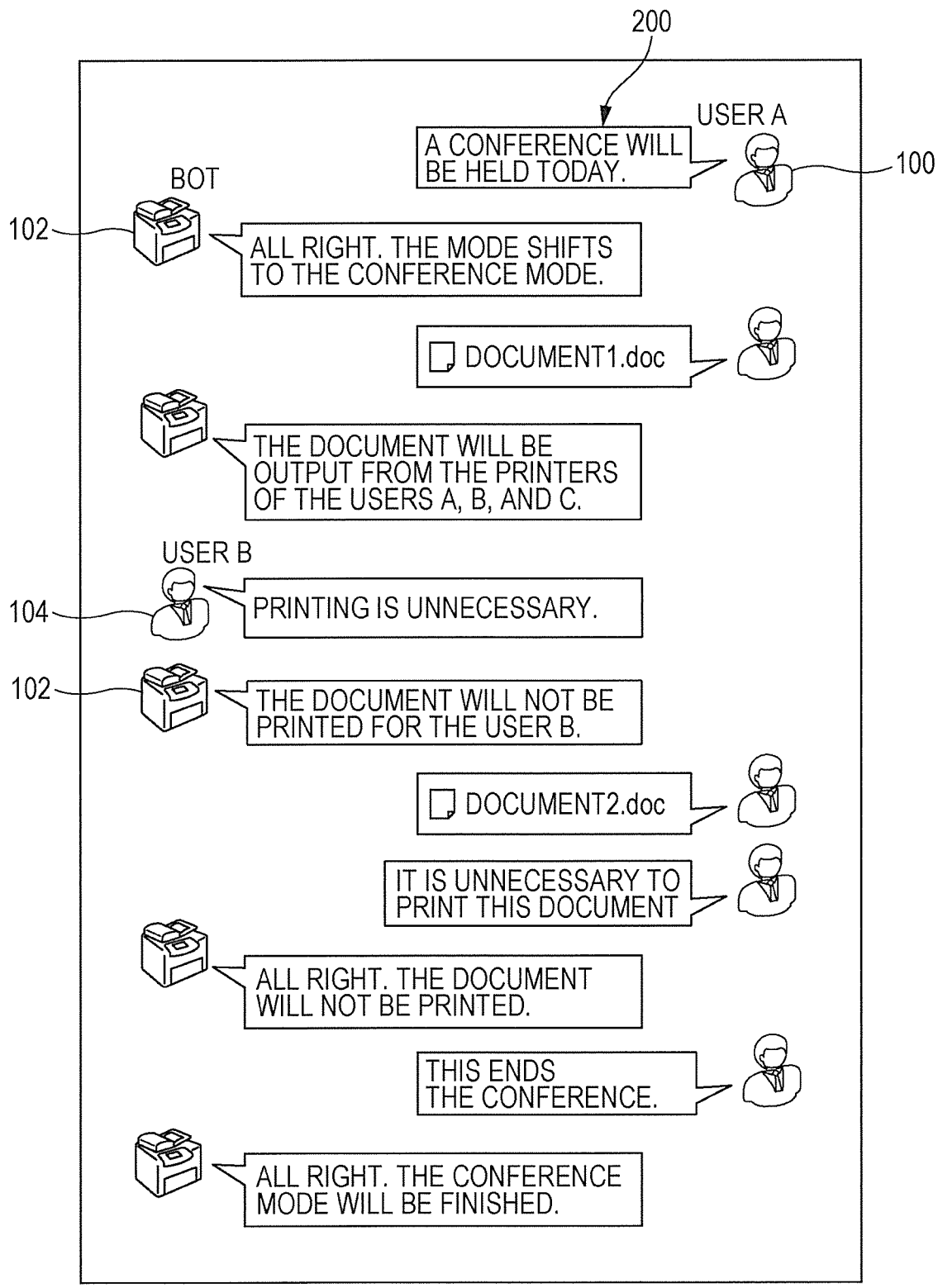
FIG. 14 illustrates an example of a screen of a group chat corresponding to the procedure of FIG. 13.

Next, an example of a dialogue on the group chat in the conference mode is described with reference to FIG. 14. FIG. 14 illustrates an example of a screen of a chat service displayed on the user terminal A (10A) operated by the user A. The users A, B, and C and the chatbot are participating in the group chat displayed on this screen.

In this example, first, the user A (100) posts a message "A conference will be held today." on the group chat. The chatbot (102), which is currently in a usual mode, interprets that the message is declaration of start of a conference since the message "A conference will be held today." means start of a conference. Accordingly, the chatbot shifts to the conference mode and posts a message "All right. The mode shifts to the conference mode." indicating that the chatbot has shifted to the conference mode on the group chat.

Next, the user A posts a document "document1.doc". Then, the chatbot, which is currently in the conference mode, regards posting of the document as a print command of the document and regards the users A, B, and C, i.e., all of the current participants of the group chat as output destinations. The chatbot waits for a predetermined extension period for which a command indicating that printing is unnecessary is accepted, but in this example, the user A does not post a command indicating that printing is unnecessary.

Accordingly, the chatbot posts a message "The document will be output from the printers of the users." on the group chat and waits for a predetermined waiting period in order to accept a command indicating that printing is unnecessary from output destination participants. In this example, the user B (104) posts a message indicating that printing is unnecessary during the waiting period. Upon detection of this message, the chatbot deletes the user B and a corresponding registered printer from the output destination list and posts a message "The document will not be printed for the user B." on the group chat in order to indicate that the command has been accepted. After elapse of the waiting period, the chatbot causes the "document1.doc" to be printed from the registered printers of the users A and C.

Then, the user A posts another document "document2.doc" on the group chat. Then, the user A posts a message "It is unnecessary to print this document" indicating that printing is unnecessary within the extension period. Since the chatbot has received the post indicating that printing is unnecessary from the same user as the user who posted the "document2.doc" within the extension period, the chatbot determines that printing is unnecessary for all of the participants and posts a message "All right. The document will not be printed." on the group chat in order to indicate that the message indicating that printing is unnecessary has been accepted. As a result, the "document2.doc" is not printed.

Next, the user A posts a message "This ends the conference." on the group chat. The chatbot recognizes that this post is a command to end the conference and shifts the conference mode to the usual mode. Then, the chatbot posts a message "All right. The conference mode will be finished." on the group chat in order to indicate that the conference mode has ended.

In the example illustrated in FIGS. 13 and 14, in a case where a print command is given in the conference mode, a participant who does not need printing among participants of the group chat posts information indicating that printing is unnecessary on the chat. However, this is merely an example. Alternatively, the chatbot may request a user who needs printing to post information indicating that printing is necessary after the print command and perform printing only from a registered printer of a user who posts information indicating that printing is necessary in response to this request.

Handling of Participant Who has not Registered Printer

In the above description, it is assumed that each participant of a group chat has a corresponding registered printer. However, there is a possibility that a participant has not registered a printer in a chatbot. The following describes an example of processing dealing with such a case.

Figure 15:
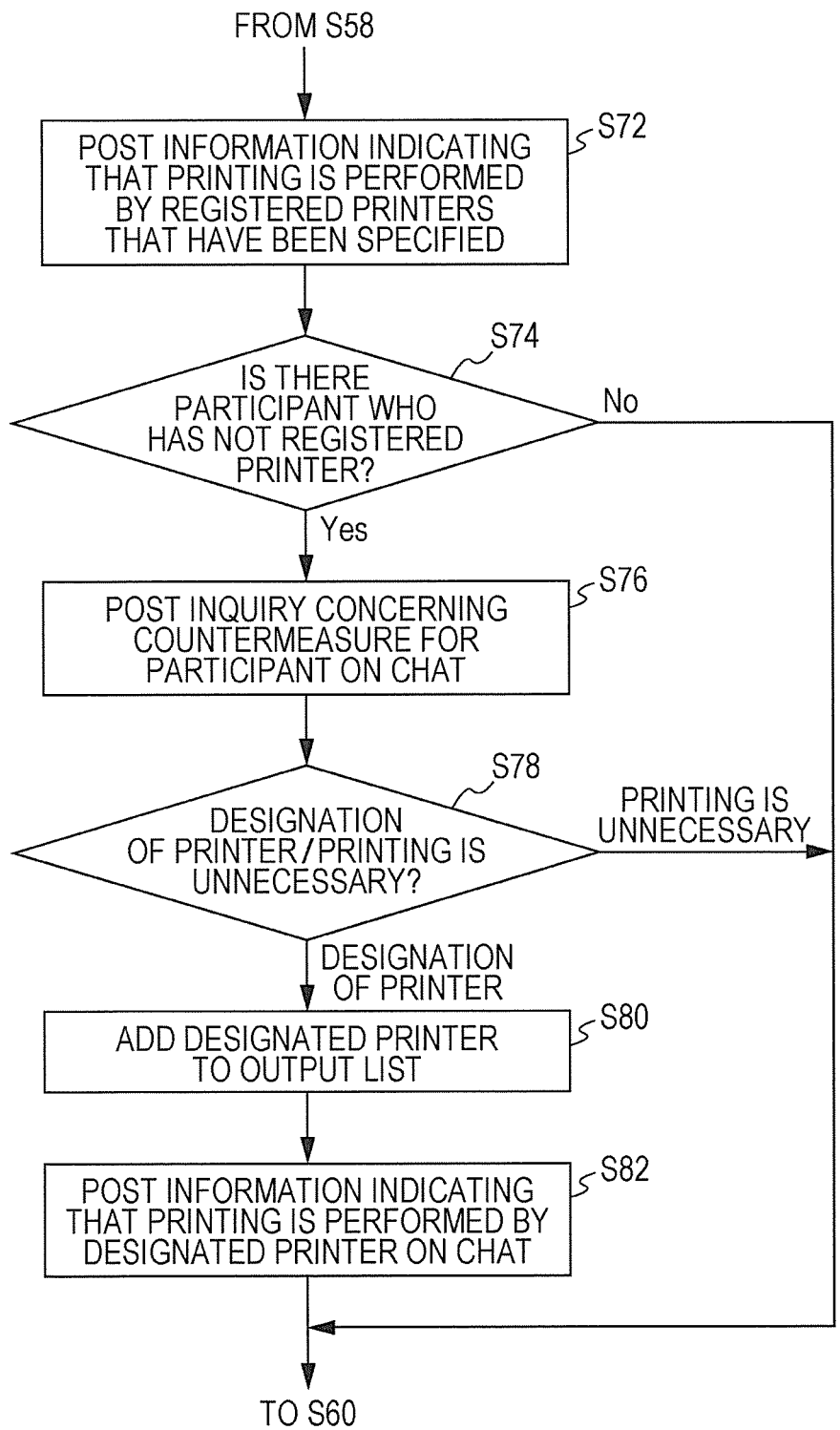
FIG. 15 illustrates a part of a processing procedure of a chatbot including processing for a chat participant who has not registered a printer.

A processing procedure obtained by replacing S59 in the processing procedure of FIG. 13 with a partial procedure illustrated in FIG. 15 is described as an example of such countermeasure processing.

In this procedure, after registered printers of participants of a group chat are specified in S56, the chatbot posts information indicating that printing is performed for each of the participants whose registered printers have been specified on the group chat (S72). Next, the chatbot determines whether or not there is a participant who has no registered printer, and in a case where a result of this determination is No, S60 (FIG. 13) is performed.

In a case where the result of the determination in S74 is Yes, the chatbot inquires, of each participant who has no registered printer, how to deal with the absence of a registered printer on the group chat or on a one-to-one chat with the participant (S76). The participant who has received the inquiry posts information indicating how to deal with the absence of a registered printer. Examples of such a post include a post indicating that the participant desires output from a registered printer of another participant close to the participant in an actual world and a post instructing the chatbot to register his or her printer. In the latter case, the participant posts, on the group chat, a character string of identification information of a printer which the participant wants to register or posts an image obtained by photographing a code image (this is, for example, attached to the printer as a seal or displayed on a screen of the printer) such as a barcode indicative of the identification information of the printer by using a terminal used for the chat. In a case where the participant does not need printing, the participant posts a reply indicating that printing is unnecessary on the chat or leaves the inquiry unanswered.

The chatbot determines whether the reaction from the participant to which the inquiry has been given is a post designating a printer or reaction indicating that printing is unnecessary (S78). Examples of the post designating a printer include a post indicating that the participant desires output from a printer of another participant and a post indicative of a command to register a printer of the participant. In a case where the reaction from the participant to which the inquiry has been given is a post designating a printer, a pair of the participant and the printer is added to the output destination list (S80). In a case where the post of the participant to which the inquiry has been given has contents indicating that the participant desires output from a printer of another participant, the chatbot may post an inquiry for the "other participant" about whether to accept the desire on the group chat or on a one-to-one chat with the "other participant". In this case, in a case where the "other participant" posts information indicative of acceptance of the desire, the chatbot registers a pair of the participant who has posted the desire and the registered printer of the "other participant" that is an output destination in the output destination list. After S80, as for the pair of the participant and the registered printer registered in the output destination list in S80, the chatbot posts information indicating that printing for the participant will be performed by the registered printer on the group chat. In a case where the "other participant" refuses the desire of the participant who has no registered printer, the chatbot inquires another measure from the participant who has no registered printer.

In a case where the reaction from the participant to which the inquiry has been given indicates that printing is unnecessary in S78, the chatbot proceeds to the process in S60.

Figure 16:
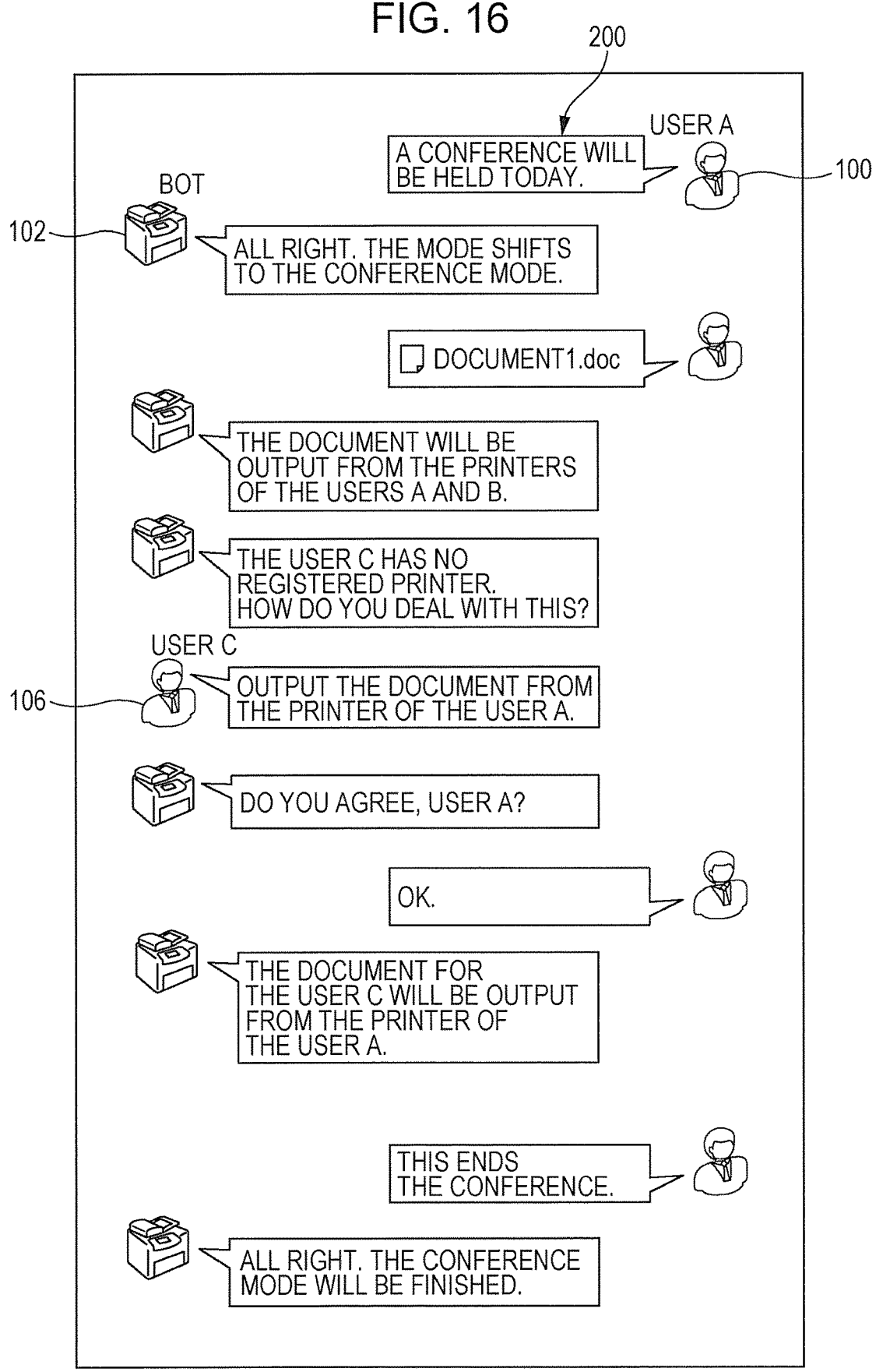
FIG. 16 illustrates an example of a screen of a group chat corresponding to the procedure of FIG. 15.

A specific example of a dialogue on a group chat in this example is described with reference to FIG. 16. FIG. 16 illustrates an example of a screen of a chat service displayed on the user terminal A (10A) operated by the user A.

In this example, the user A (100) declares start of a conference on the group chat, the chatbot posts information indicating that the chatbot has shifted to the conference mode in response to this, and the user A posts a document "document1.doc". This is identical to the example of FIG. 14. The chatbot, which is currently in the conference mode, finds registered printers of the users A, B, and C, i.e., all current participants of the group chat from the user information storage unit 165 in order to print out the document for these users. In this example, it is assumed that the users A and B have a registered printer but the user C has no registered printer.

In this case, the chatbot (102) posts a message "The document will be output from the printers of the users A and B." on the group chat and further posts a message "The user C has no registered printer. How do you deal with this?" asking the user C to take a measure.

It is assumed that the user C (106) posts a message "Output the document from the printer of the user A." in response to this. Then, the chatbot posts a message "Do you agree, user A?" asking the user A if the user A accepts the desire of the user C on the group chat. In the example illustrated in FIG. 16, the user A posts a message "OK." indicating that the user A accepts the desire of the user C. In response to this, the chatbot adds the registered printer of the user A to the output destination list in association with the user C. In this case, the output destination list includes two users, i.e., the user A and the user C as user for whom the document is to be output from the registered printer of the user A. The chatbot posts a message "The document for the user C will be output from the printer of the user A." on the group chat and then instructs the corresponding printers to execute jobs for the users A, B, and C included in the output destination list. In this case, two print commands are given to the registered printer of the user A, and a single print command is given to the printer of the user B.

Output from Printer Other than Registered Printer

The example described with reference to FIGS. 15 and 16 is processing for a user who has not registered a printer.

Meanwhile, it is sometimes inconvenient for even a user who has a registered printer to use the registered printer from a current whereabout, for example, in a case where the user is participating in a group chat at somewhere outside the place where the registered printer is installed. In view of this, the following describes a mechanism for temporarily accepting a user's desire of printing from a printer other than a registered printer.

Figure 17:
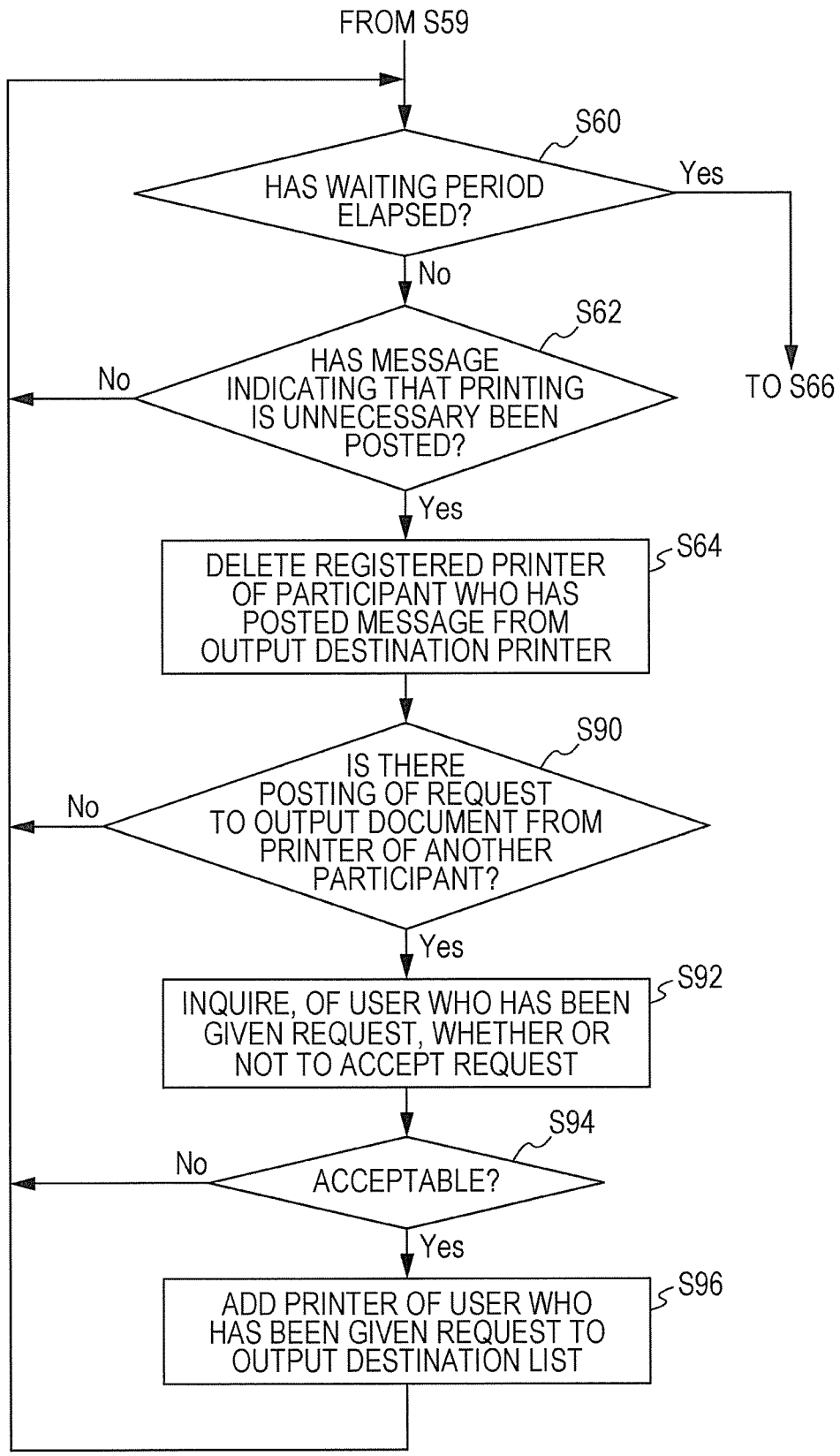
FIG. 17 illustrates a part of a processing procedure of a chatbot including processing for output from a printer different from a registered printer.

FIG. 17 illustrates a substantial part of the procedure of this example. The partial procedure illustrated in FIG. 17 replaces S60 to S62 in the processing procedure of FIG. 13.

In this procedure, the chatbot posts information indicating that the document is output from registered printers of participants of the group chat in S59 and then accepts a command indicating that printing is unnecessary from the participants for a predetermined waiting period (S62 and S64). This is similar to the procedure of FIG. 13.

Furthermore, the chatbot accepts posting of a participant's request to output the document from a registered printer of another participant instead of his or her registered printer during the waiting period (S90). In a case where such a request is made from any participant, the chatbot inquires, of the "other participant" who has been given the request, whether or not to accept the request (S92). Then, the chatbot determines whether or not a reply indicative of "acceptable" has been made by the "other participant" (S94). In a case where the reply indicative of "acceptable" has been made, the chatbot registers, in the output destination list, the user who has made the request in association of the registered printer of the participant who has been given the request (S96). The order of S90 to S94 and S62 to S64 is not limited to the example illustrated in FIG. 17.

Figure 18:
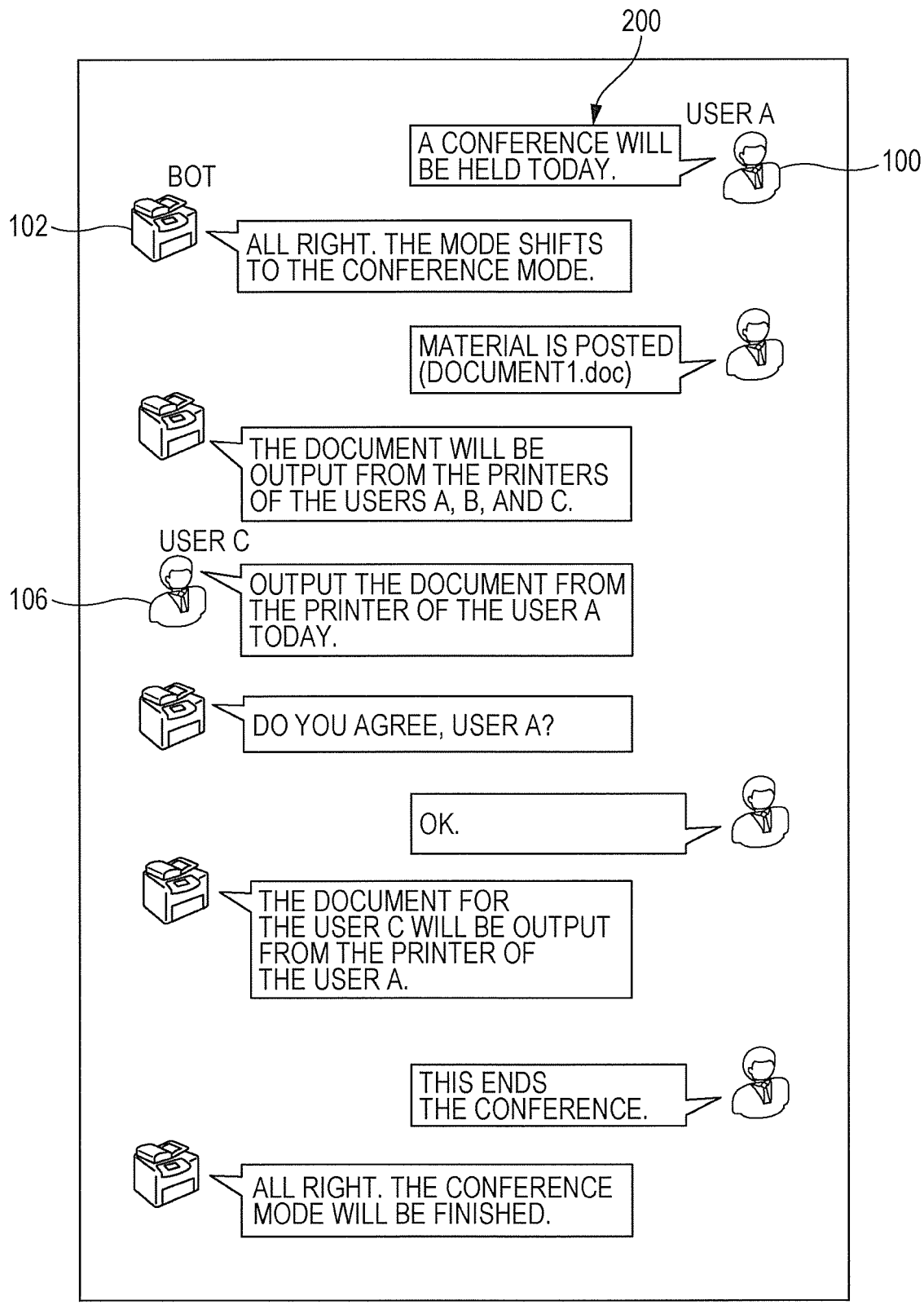
FIG. 18 illustrates an example of a screen of a group chat corresponding to the procedure of FIG. 17.

A specific example of a dialogue on the group chat in this example is described with reference to FIG. 18. FIG. 18 illustrates an example of a screen of a chat service displayed on the user terminal A (10A) operated by the user A.

In this example, the user A (100) declares start of a conference on the group chat, the chatbot posts information indicating that the chatbot has shifted to the conference mode in response to this, the user posts a document "document1.doc", and the chatbot posts information indicating that the document will be output from printers of the users A, B, and C who are participants in response to this. This is identical to the example of FIG. 14.

During the waiting period, the user C (106) posts a message "Output the document from the printer of the user A today." requesting output from the registered printer of another participant.

Then, the chatbot posts a message "Do you agree, user A?" asking the user A if the user A accepts the request from the user C on the group chat. In the example illustrated in FIG. 18, the user A posts a message "OK." indicating that the user A accepts the desire of the user C in response to this. In response to this, the chatbot adds the registered printer of the user A to the output destination list in association with the user C. In this case, the output destination list includes two users, i.e., the user A and the user C as users for whom the document is to be output from the registered printer of the user A. The chatbot posts a message "The document for the user C will be output from the printer of the user A" on the group chat and then instructs the corresponding printers to execute jobs for the users A, B, and C included in the output destination list. In this case, two print commands are given to the registered printer of the user A, and a single print command is given to the printer of the user B.

Example Other than Printing

In the above description, a chatbot that controls a registered printer registered by a user in accordance with a comment of the user on a chat is used as an example. However, the control of the above exemplary embodiment is applicable to a chatbot that controls an output device other than a printer. Examples of the output device to which the control of the above exemplary embodiment is applicable include a 3D printer that creates a three-dimensional object, a speaker (e.g., an AI speaker) that outputs voice, and a controller that controls a display of a large screen that displays a moving image and the like. For example, a chatbot that controls a speaker registered by a user, in a case where an audio file is posted on a group chat, sends the audio file to a speaker of each user designated as an output destination (after converting the audio file into a data format that is supported by the speaker as needed) and causes the speaker to output the audio file.

The bot server illustrated above is, for example, realized by causing a computer to execute programs representative of the above functions. The computer has, for example, a circuit configuration in which a microprocessor such as a CPU, memories (first storages) such as a random access memory (RAM) and a read only memory (ROM), a controller that controls fixed storage devices such as a flash memory, a solid state drive (SSD), and a hard disk drive (HDD), various I/O (input output) interfaces, a network interface that performs control for connection with a network such as a local area network, and the like are connected as hardware, for example, through a bus. Programs describing processing contents of these functions are stored in the fixed storage device such as a flash memory over a network or the like and are then installed in the computer. The programs stored in the fixed storage device are read out to the RAM and are executed by the microprocessor such as a CPU. In this way, the above function modules are realized.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory in which information on output devices corresponding to a plurality of users participating in a group chat is stored; and
   a controller that, in a case where any one of the plurality of users gives a post indicative of an output command to output data on the group chat, performs control for outputting the data from output devices corresponding to one or more output destination users including a user who has not given the post indicative of the output command among the plurality of users in accordance with the information stored in the memory.

2. The information processing apparatus according to claim 1, further comprising a unit that acquires performance information indicative of performance of the output devices corresponding to the plurality of users,
   wherein in a case where the output devices corresponding to the output destination users include an output device whose performance is not enough to output the data based on output settings corresponding to the output command, the controller executes countermeasure processing that enables output from the output device whose performance is not enough.

3. The information processing apparatus according to claim 2, wherein
   as the countermeasure processing, the controller gives, to the user who has given the output command, a second post proposing output settings that are met by all of the output devices corresponding to the output destination users; and
   in a case where the user who has given the output command gives a third post indicative of acceptance of the output settings proposed in the second post, the controller changes the output settings to the output settings proposed in the second post.

4. The information processing apparatus according to claim 2, wherein
   as the countermeasure processing, the controller gives a fourth post proposing, individually for each output device whose performance is not enough to output the data based on the output settings among the output devices corresponding to the output destination users, to change the output settings to output settings that enable output from the output device whose performance is not enough; and
   in a case where the user who has given the output command or a user associated with the output device whose performance is not enough gives a fifth post indicative of acceptance of the proposal in response to the fourth post, the controller performs control for causing the data to be output from the output device whose performance is not enough based on the changed output settings proposed in the fourth post.

5. The information processing apparatus according to claim 2, wherein
   in a case where the user who has given the output command gives a post indicating that the user entrusts the controller with a countermeasure, the controller performs, as the countermeasure processing for each of the output devices corresponding to the output destination users, control for converting the data into a state that enables output by the performance of the output device and outputting the converted data from the output device.

6. The information processing apparatus according to claim 1, wherein
   the controller switches an operation mode in the group chat to a specific mode or a non-specific mode in accordance with posting of any one of the users on the group chat; and
   in a case where any one of the users gives a post indicative of an output command to output the data during the specific mode, the controller performs control for regarding all of the users of the group chat as the output destination users and then outputting the data from the output devices corresponding to the output destination users.

7. The information processing apparatus according to claim 6, wherein
   in a case where data of a kind supported by the output devices is posted in the specific mode, the controller performs control for regarding the posting of the data as an output command to output the data even in a case where a post indicative of an output command to output the data is not given.

8. The information processing apparatus according to claim 7, wherein
   in a case where a user who has posted the data gives, in connection with the posting of the data, a post indicating that output of the data is unnecessary, the controller does not perform the control for regarding the posting of the data as an output command to output the data.

9. The information processing apparatus according to claim 6, wherein
   in a case where the user gives a post indicative of an output command to output the data in the non-specific mode and where the post includes designation of an output destination user, the controller performs control for outputting the data from an output device corresponding to the output destination user.

10. The information processing apparatus according to claim 6, wherein
    in a case where the user gives a post indicative of an output command to output the data in the non-specific mode and where the post does not include designation of an output destination user, the controller performs control for outputting the data from an output device corresponding to the user who has given the post indicative of the output command.

11. The information processing apparatus according to claim 1, wherein
    in a case where an output device corresponding to a first output destination user is not stored in the memory although a post indicative of an output command to output the data has been given, the controller gives a post inquiring desired handling of output of the data from the first output destination user; and in a case where the first output destination user gives a post indicative of a desire to output the data from an output device corresponding to a second output destination user in response to the post, the controller performs control for outputting the data for the first output destination user from the output device corresponding to the second output destination user.

12. The information processing apparatus according to claim 1, wherein in a case where on the group chat, a first output destination user gives, in connection with a post indicative of an output command to output data, a post indicative of a desire to output the data from an output device corresponding to a second output destination user, the controller performs control for outputting the data for the first output destination user from the output device corresponding to the second output destination user.

13. The information processing apparatus according to claim 11, wherein in a case where the first output destination user gives a post indicative of a desire to output the data from the output device corresponding to the second output destination user, the controller gives a post inquiring, of the second output destination user, whether or not to permit output for the first output destination user; and in a case where the second output destination user gives a post indicative of permission of output for the first output destination user in response to the post, the controller performs control for outputting the data for the first output destination user from the output device corresponding to the second output destination user.

14. The information processing apparatus according to claim 12, wherein in a case where the first output destination user gives a post indicative of a desire to output the data from the output device corresponding to the second output destination user, the controller gives a post inquiring, of the second output destination user, whether or not to permit output for the first output destination user; and in a case where the second output destination user gives a post indicative of permission of output for the first output destination user in response to the post, the controller performs control for outputting the data for the first output destination user from the output device corresponding to the second output destination user.

15. A non-transitory computer readable medium storing a program causing a computer to function as:

a memory in which information on output devices corresponding to a plurality of users participating in a group chat is stored; and a controller that, in a case where any one of the plurality of users gives a post indicative of an output command to output data on the group chat, performs control for outputting the data from output devices corresponding to one or more output destination users including a user who has not given the post indicative of the output command among the plurality of users in accordance with the information stored in the memory.

16. An information processing apparatus comprising:

storage means for storing therein information on output devices corresponding to a plurality of users participating in a group chat; and control means for, in a case where any one of the plurality of users gives a post indicative of an output command to output data on the group chat, performing control for outputting the data from output devices corresponding to one or more output destination users including a user who has not given the post indicative of the output command among the plurality of users in accordance with the information stored in the memory.

* * * * *